US006687595B2

(12) United States Patent
Seto et al.

(10) Patent No.: US 6,687,595 B2
(45) Date of Patent: Feb. 3, 2004

(54) ADAPTIVE CRUISE CONTROL SYSTEM FOR VEHICLE

(75) Inventors: Yoji Seto, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/197,562

(22) Filed: Jul. 18, 2002

(65) Prior Publication Data

US 2003/0028311 A1 Feb. 6, 2003

(30) Foreign Application Priority Data

Jul. 31, 2001 (JP) ........................................ 2001-231744

(51) Int. Cl.$^7$ ............................................... B60K 31/00
(52) U.S. Cl. ........................ 701/96; 340/903; 340/436
(58) Field of Search ............................. 701/96, 93, 301; 180/170; 340/436, 435, 903

(56) References Cited

U.S. PATENT DOCUMENTS

| 6,161,073 | A | | 12/2000 | Tange et al. | |
|---|---|---|---|---|---|
| 6,199,001 | B1 | * | 3/2001 | Ohta et al. | ...................... 701/51 |
| 6,401,024 | B1 | * | 6/2002 | Tange et al. | ................... 701/96 |
| 6,430,494 | B1 | * | 8/2002 | Inoue et al. | .................... 701/96 |
| 6,459,982 | B1 | * | 10/2002 | Kobayashi et al. | ............ 701/93 |
| 6,473,686 | B2 | * | 10/2002 | Adachi et al. | ................. 701/96 |
| 6,505,111 | B1 | * | 1/2003 | Tange et al. | ................... 701/96 |

FOREIGN PATENT DOCUMENTS

| JP | 11-278096 | 10/1999 |
|---|---|---|
| JP | 2000-313245 | 11/2000 |

OTHER PUBLICATIONS

2002/0055813–Adachi et al –May 9, 2002 –An automatic vehicular velocity control apparatus for automative vehicle.*
2002/0111733–Akabori et al –Aug. 15, 2002–a vehicle vilocity control apparatus and method with preceding vehicle following control function.*

* cited by examiner

Primary Examiner—William A. Cuchlinski, Jr.
Assistant Examiner—Olga Hernandez
(74) Attorney, Agent, or Firm—Foley & Lardner

(57) ABSTRACT

An adaptive cruise control (ATCC) system for a host-vehicle controls one of a driving force and a brake hydraulic pressure according to a command vehicle speed calculated on the basis of an inter-vehicle distance and a host-vehicle speed. The ATCC system gradually decreases a deceleration of the host-vehicle according to an approach of the host-vehicle speed toward a control-cancel vehicle speed when the host-vehicle speed becomes lower than or equal to a gradual-deceleration starting vehicle speed during a period of decreasing the host-vehicle speed toward the control-cancel vehicle speed, so that the deceleration takes a value near zero when the host-vehicle speed reaches the control-cancel vehicle speed.

16 Claims, 13 Drawing Sheets

ADAPTIVE CRUISE CONTROL SYSTEM FOR VEHICLE

BACKGROUND OF THE INVENTION

The present invention relates to an adaptive cruise control (ATCC) system which executes a following control for following a preceding vehicle ahead of a host-vehicle while keeping a predetermined inter-vehicle distance, and more particularly to an ATCC system which cancels the following control for keeping the inter-vehicle distance when a host-vehicle speed becomes smaller than a control-cancel vehicle speed.

Japanese Patent Provisional Publication No. 2000-313245 discloses a following control system which cancels a following control by decreasing a deceleration of a host-vehicle according to elapsed time.

SUMMARY OF THE INVENTION

However, this control system is arranged to decrease a deceleration according to the elapse of time with a predetermined constant gradient when the host-vehicle speed becomes lower than a preset vehicle speed. This arrangement varies a control-cancel vehicle speed according to the magnitude of the deceleration, and therefore a driver of the host-vehicle may receive a strange feeling therefrom.

It is therefore an object of the present invention to provide an improved adaptive cruise control (ATC) system which enables a deceleration at a predetermined control-cancel vehicle speed to be smoothly controlled at a value near zero regardless a magnitude of the deceleration when the deceleration is gradually decreased from a moment that the host-vehicle speed reaches the following control-cancel vehicle speed.

An aspect of the present invention resides an adaptive cruise control (ATCC) system for a host-vehicle which system comprises a controller. The controller is programmed to detect an inter-vehicle distance between the host-vehicle and a preceding vehicle ahead of the host-vehicle, to detect a host-vehicle speed of the host-vehicle, to calculate a command vehicle speed on the basis of the inter-vehicle distance and the host-vehicle speed to bring the inter-vehicle distance closer to a target inter-vehicle distance, to control one of a driving force and a braking force according to the command vehicle speed, to cancel controlling one of the driving force and the braking force according to the command vehicle speed when the host-vehicle speed is lower than or equal to a control-cancel vehicle speed, and to gradually decrease a deceleration of the host-vehicle according to an approach of the host-vehicle speed toward the control-cancel vehicle speed when the host-vehicle speed becomes lower than or equal to a gradual-deceleration starting vehicle speed during a period of decreasing the host-vehicle vehicle toward the control-cancel vehicle speed, so that the deceleration takes a value near zero when the host-vehicle speed reaches the control-cancel vehicle speed.

Another aspect of the present invention resides in an adaptive cruise control (ATCC) system for a host-vehicle which system comprises a controller. The controller is programmed to detect an inter-vehicle distance between the host-vehicle and a preceding vehicle ahead of the host-vehicle, to detect a host-vehicle speed of the host-vehicle, to calculate a command vehicle speed on the basis of the inter-vehicle distance and the host-vehicle speed to bring the inter-vehicle distance closer to a target inter-vehicle distance, to control one of a driving force and a brake hydraulic pressure according to the command vehicle speed, to cancel controlling one of the driving force and the brake hydraulic pressure according to the command vehicle speed when the host-vehicle speed is lower than or equal to a control-cancel vehicle speed, and to gradually decrease the brake hydraulic pressure according to an approach of the host-vehicle speed toward the control-cancel vehicle speed when the host-vehicle speed becomes lower than or equal to a gradual-deceleration starting vehicle speed during a period of decreasing the host-vehicle speed toward the control-cancel vehicle speed, so that the brake hydraulic pressure takes a value near zero when the host-vehicle speed reaches the control-cancel vehicle speed.

A further another aspect of the present invention resides in a method of executing an adaptive cruise control of a host-vehicle. The method comprises a step of detecting an inter-vehicle distance between the host-vehicle and a preceding vehicle ahead of the host-vehicle; a step of detecting a vehicle speed of the host-vehicle; a step of calculating a command vehicle speed on the basis of the inter-vehicle distance and the host-vehicle speed to bring the inter-vehicle distance closer to a target inter-vehicle distance; a step of controlling one of a driving force and a braking force according to the command vehicle speed; a step of canceling to control one of a driving force and a braking force according to the command vehicle speed when the host-vehicle speed is smaller than or equal to a control-cancel vehicle speed; and a step of gradually decreasing a deceleration of the host-vehicle according to an approach of the host-vehicle speed to the control-cancel vehicle speed when the host-vehicle speed becomes lower than or equal to a gradual-deceleration starting vehicle speed during a period of decreasing the host-vehicle speed toward the control-cancel vehicle speed, so that the deceleration takes a value near zero when the host-vehicle speed reaches the control-cancel vehicle speed.

The other objects and features of this invention will become understood from the following description with reference to the accompanying drawings.

DETAILED DESCRIPTION OF THE INVENTION

Referring to FIGS. 1 to 11, there is shown a first embodiment of an adaptive cruise control (ACC) system for a host-vehicle 1 in accordance with the present invention. This ACC control system mainly executes a preceding-vehicle following control for following a preceding vehicle ahead of host-vehicle 1.

Figure 1:
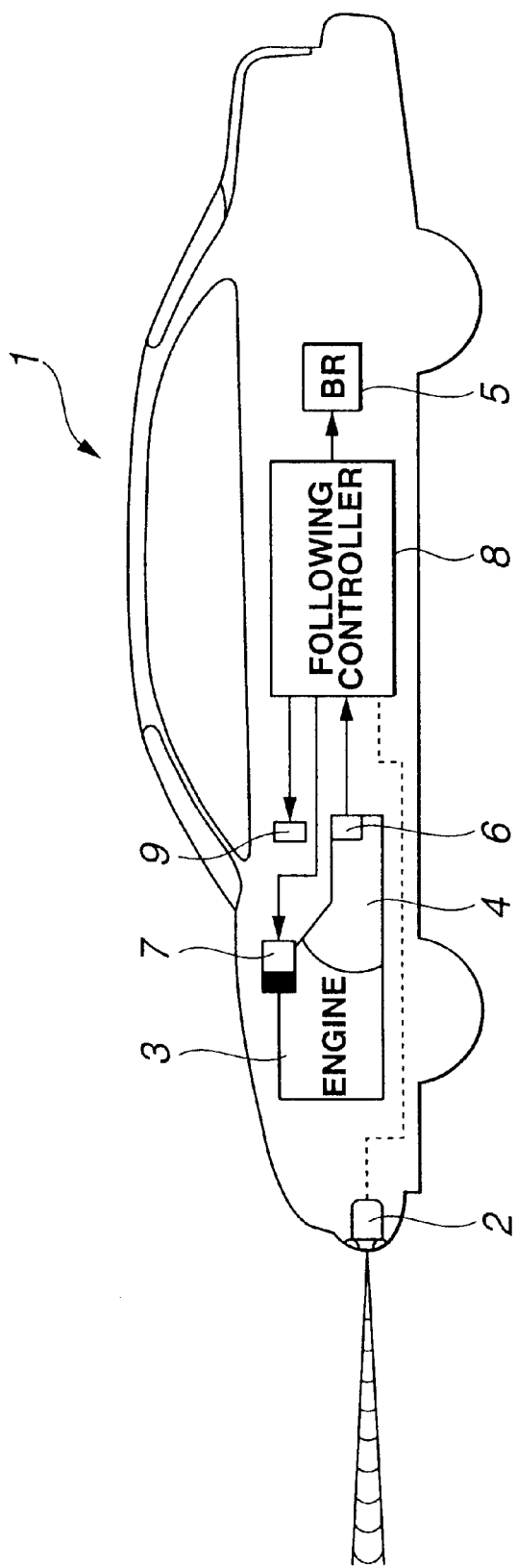
FIG. 1 is a schematic view showing a basic construction of an adaptive cruise control (ATCC) system according to a first embodiment of the present invention.

As shown in FIG. 1, an inter-vehicle distance sensor 2 is attached at a front end portion of host-vehicle 1. Inter-vehicle distance sensor 2 employed in this first embodiment is of a radar type which sweepingly emits laser beam in the forward direction and receives the reflection beam thereof to detect a distance to an obstacle reflecting the laser beam. Other type such as a radio-wave type or an ultrasonic type may be employed as inter-vehicle distance sensor 2.

Host vehicle 1 comprises an internal combustion engine 3 which generates rotational driving force. The rotational driving force generated by internal combustion engine 3 is transmitted to an automatic transmission 4 in which a gear ratio is automatically selected according to a desired vehicle speed and/or an engine torque. The power outputted from automatic transmission 4 is transmitted to driven wheels (front wheels and/or rear wheels) of host-vehicle 1. A brake actuator 5 such as a disc brake is attached to each wheel.

A vehicle speed sensor 6 is attached to an output shaft of automatic transmission 4 and outputs a periodical pulse train responsive to a rotation speed of the output shaft of automatic transmission 4. Engine 3 is equipped with a throttle actuator 7 which is capable of opening and closing a throttle valve of engine 3 according to a throttle opening signal. That is, by properly controlling the opening of the throttle valve, throttle actuator 7 controls an intake air quantity of engine 3 and thereby controlling an engine output.

Brake actuator 5 and throttle actuator 7 are controlled by a following controller 8. Following control 8 receives signals from inter-vehicle distance sensor 2 and vehicle speed sensor 6. following controller 8 executes an adaptive cruise control (ACC) control for following a preceding-vehicle ahead of host-vehicle 1 while keeping a proper inter-vehicle distance therebetween, by controlling brake actuators 5 and throttle actuator 7 on the basis of an inter-vehicle distance L detected by inter-vehicle distance sensor 2 and a host-vehicle speed $V_S$ detected by vehicle speed sensor 6.

Figure 2:
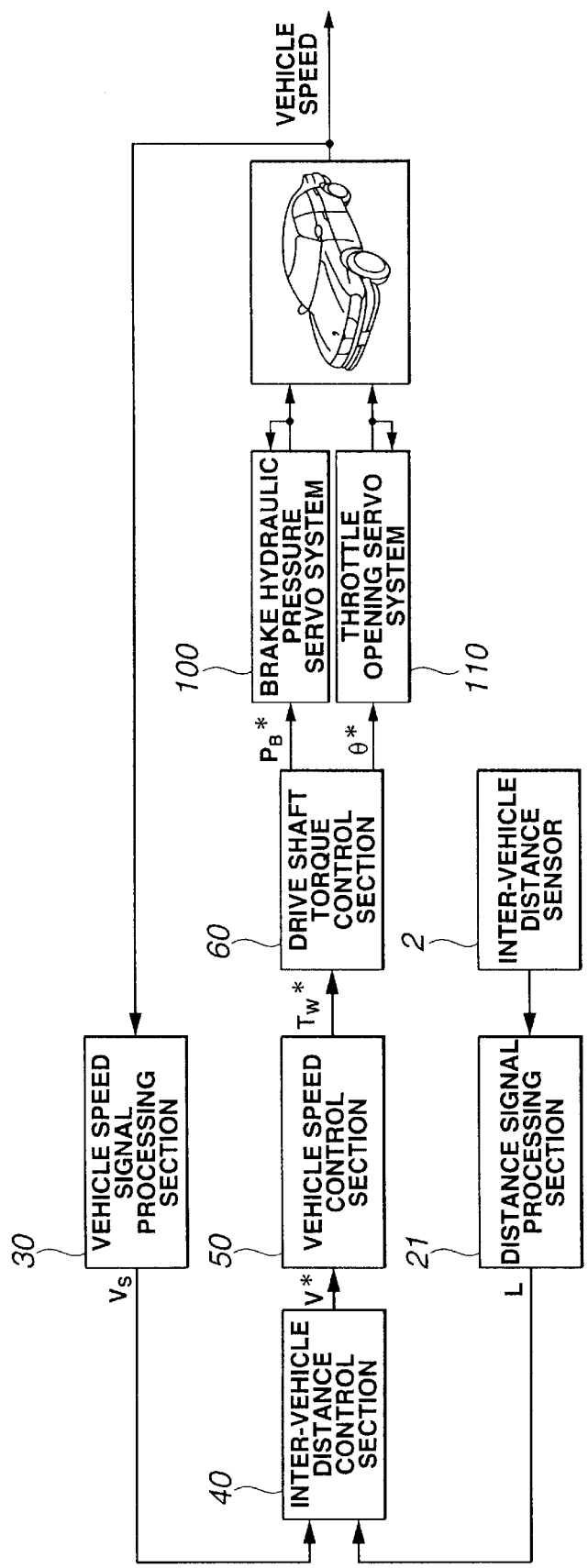
FIG. 2 is a block diagram showing a specific construction of a following controller of FIG. 1.

Following controller 8 comprises a microcomputer and peripheral devices of the microcomputer and further comprises a control block in the form of software previously stored therein as shown in FIG. 2. This control block shown in FIG. 2 comprises a distance signal processing section 21, a vehicle speed signal processing section 30, an inter-vehicle distance control section 40, a vehicle speed control section 50, a drive shaft torque control section 60, a brake hydraulic pressure servo system 100 and a throttle opening servo system 110.

Distance signal processing section 21 measures a time period from a moment of sweepingly emitting laser beam from inter-vehicle distance sensor 2 to a moment of receiving reflected beam of a preceding vehicle and calculates inter-vehicle distance L between the preceding-vehicle and the host-vehicle 1 on the basis of the measured time period. Vehicle speed signal processing section 30 measures a cycle period of vehicle speed indicative pulses outputted from vehicle speed sensor 6 and calculates host vehicle speed $V_S$ on the basis of the measured cycle period. Inter-vehicle distance control section 40 calculates a command vehicle speed (target vehicle speed) V* needed for maintaining inter-vehicle distance L at target inter-vehicle distance L* on the basis of inter-vehicle distance L calculated at distance signal processing section 21 and host-vehicle speed $V_S$ calculated at vehicle speed signal processing section 30.

Vehicle speed control section 50 calculates a command drive-shaft torque (target drive-shaft torque) $T_W$* on the basis of command vehicle speed V* calculated at inter-vehicle distance control section 40. Drive shaft torque control section 60 calculates a command throttle opening θ* to be supplied to throttle actuator 7 and a command brake hydraulic pressure $P_B$* to be supplied to brake actuators 5 on the basis of target drive-shaft torque $T_W$*. Drive shaft torque control section 60 outputs command throttle opening θ* to throttle opening servo system 110 and outputs command brake hydraulic pressure $P_B$* to brake hydraulic pressure servo system 100.

Figure 3:
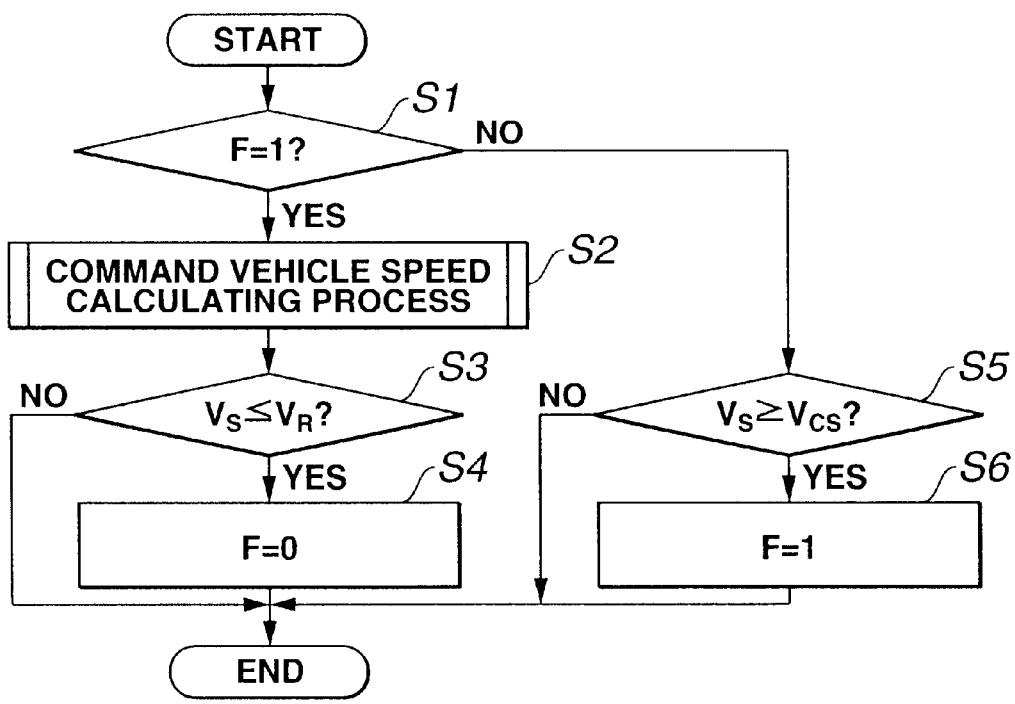
FIG. 3 is a flowchart showing an inter-vehicle distance control process executed by an inter-vehicle distance control section of FIG. 2.

Inter-vehicle distance control section 40 executes an inter-vehicle distance control process shown in FIG. 3. The inter-vehicle distance control process is executed as a timer interruption process at predetermined intervals (50 msec) with respect to a predetermined main program of following controller 8.

At step S1, inter-vehicle distance control section 40 of controller 8 determines whether a control-condition flag F is set at 1 or not. The control-condition flag F represents whether an inter-vehicle distance control is being executed or not. That is, if F=1, the inter-vehicle distance control is being executed, and if F=0, the inter-vehicle distance control is not being executed. When the determination at step S1 is affirmative (F=1), the routine proceeds to step S2. When the determination at step S1 is negative (F=0), the routine proceeds to step S5.

At step S2, controller 8 executes a command vehicle speed calculation process for bring inter-vehicle distance L closer to a target inter-vehicle distance L*.

At step S3, controller 8 determines whether a host-vehicle speed $V_S$ is lower than or equal to a preset control-cancel vehicle speed $V_R$ which is a relatively small value. When the determination at step S3 is negative ($V_S>V_R$), the routine jump to an end block wherein the present routine of the inter-vehicle distance control is terminated, and the routine returns to the main program routine. When the determination at step S3 is affirmative ($V_S \leq V_R$), the routine proceeds to step S4 wherein control-condition flag F is reset (F=0) and the present routine is terminated.

At step S5 subsequent to the negative determination at step S1, controller 8 determines whether host-vehicle speed $V_S$ is higher than or equal to a control-start vehicle speed $V_{CS}$ which is set at the sum of control-cancel vehicle speed $V_R$ and a predetermined value $\Delta V_R$ ($V_{CS}=V_R+\Delta V_R$) in order to have a hysteresis relative to control-cancel vehicle speed $V_R$. When the determination at step S5 is negative ($V_S<V_{CS}$), controller 8 determines that the control-cancel condition is maintained. Therefore, the routine jumps to the end block. When the determination at step S5 is affirmative ($V_S \geq V_{CS}$), controller 8 determines that the inter-vehicle distance control is started. Therefore, the routine proceeds to step S6 wherein control-condition flag F is set at 1 (F=1). Then, the routine proceeds to the end block.

The command vehicle speed calculation process executed at step S2 of FIG. 3 is shown by a flowchart of FIG. 4, and is executed as follows.

Figure 4:
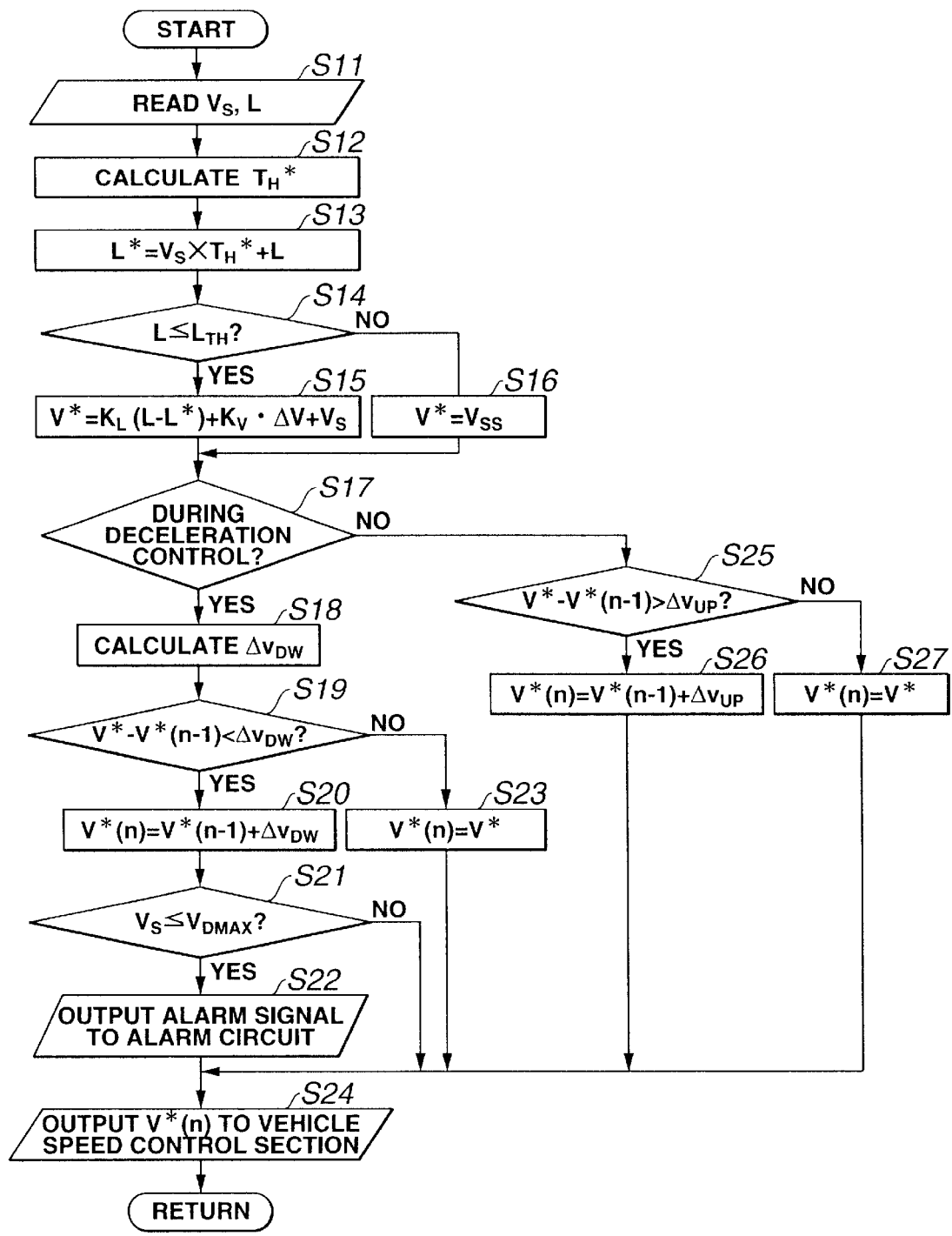
FIG. 4 is a flowchart showing a command vehicle speed calculation process of FIG. 3.

At step S11 of FIG. 4, controller 8 reads inter-vehicle distance L calculated at distance signal processing section 21 and host-vehicle speed $V_S$ calculated at vehicle speed signal processing section 30.

Figure 5:
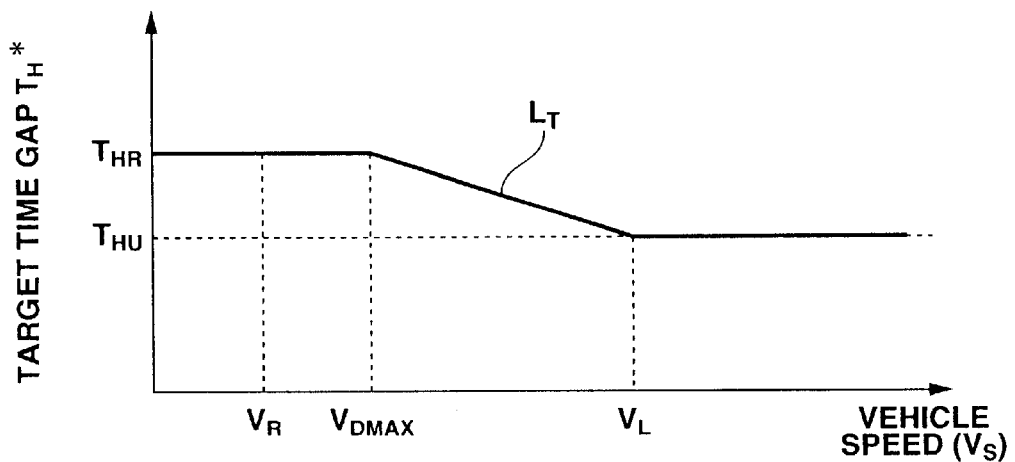
FIG. 5 is a target time gap calculation map representative of a relationship between a host-vehicle speed and a target time gap.

At step S12, controller 8 calculates a target time gap $T_H^*$ on the basis of host-vehicle speed $V_S$ and with reference to a target time gap calculation map shown in FIG. 5. The target time-gap calculation map represents a relationship that target time gap $T_H^*$ is maintained at an ordinary value $T_{HU}$ when host-vehicle speed $V_S$ is higher than a predetermined low vehicle speed $V_L$, that target time gap $T_H^*$ is gradually increased according to the decrease of host-vehicle speed $V_S$ when host-vehicle speed $V_S$ is in a range between the predetermined value $V_L$ and a maximum gradual-deceleration start speed $V_{DMAX}$ at which a deceleration gradual control is started, and that target time gap $T_H^*$ is maintained at a control-cancel set value $T_{HR}$ which is larger than ordinary value $T_{HU}$ when host-vehicle speed $V_S$ is lower than maximum gradual-deceleration start speed $V_{DMAX}$.

At step S13, controller 8 calculates a target inter-vehicle distance $L^*$ on the basis of target time gap $T^*$ and host-vehicle speed $V_S$ by executing the calculation of the following expression (1):

$$L^* = V_S \times T_H^* + L_0 \quad (1)$$

where $L_0$ is an inter-vehicle distance at a vehicle stop state. By employing a concept of the time gap, the inter-vehicle distance is increased as the host-vehicle speed increases.

At step S14, controller 8 determines whether or not there is a preceding-vehicle ahead of the host-vehicle 1. This determination is executed by determining whether or not inter-vehicle distance L is smaller than or equal to a threshold $L_{TH}$, which is previously set as a threshold for determining the presence or absence of a preceding-vehicle. When the determination at step S14 is affirmative ($L \leq L_{TH}$), the routine proceeds to step S15. When the determination at step S14 is negative ($L > L_{TH}$), the routine proceeds to step S16.

At step S15 subsequent to the affirmative determination at step S14, controller 8 calculates command vehicle speed $V^*$ from the following expression (2):

$$V^* = K_L(L-L^*) + K_V \cdot \Delta V + V_S \quad (2)$$

where command vehicle speed $V^*$ is defined as a host-vehicle speed by which inter-vehicle distance L is brought closer to target inter-vehicle distance $L^*$, $K_L$ and $K_V$ are constants, and $\Delta V$ is a relative speed between host-vehicle 1 and the preceding-vehicle and is obtained by differentiating inter-vehicle distance L.

At step S16 subsequent to the negative determination at step S14, controller 8 sets command vehicle speed $V^*$ at a set vehicle-speed $V_{SS}$ which has been set by a driver through a not-shown vehicle-speed set switch.

At step S17 subsequent to the execution of step S15 or step S16, controller 8 determines whether a deceleration control is being executed or not. When the determination at step S17 is affirmative, the routine proceeds to step S18. When the determination at step S17 is negative, the routine proceeds to step S25.

Figure 6:
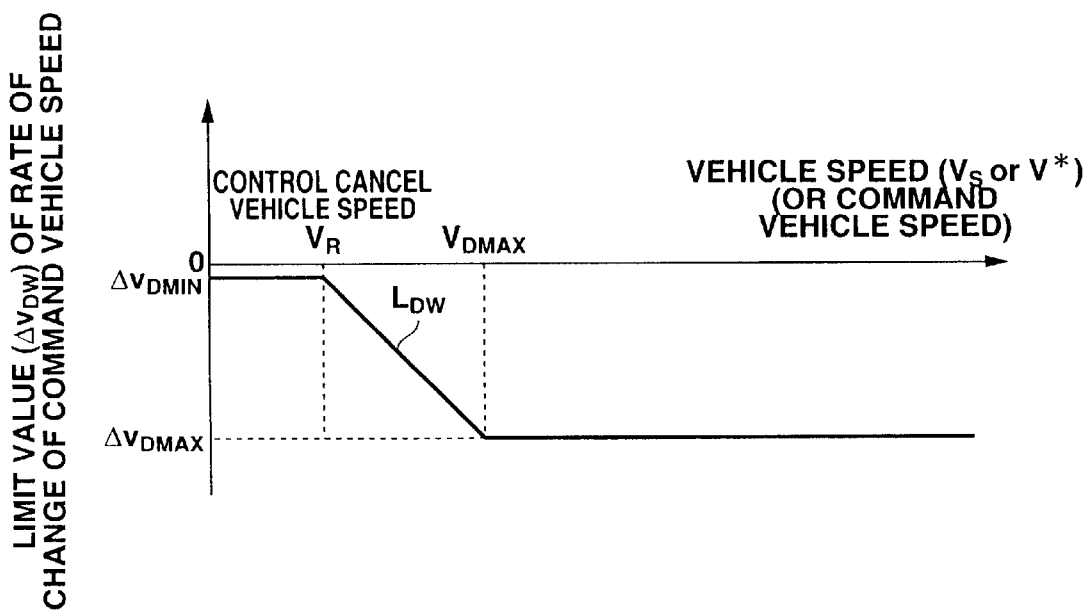
FIG. 6 is a limit value calculation map representative of a relationship between host-vehicle speed and a limit value of rate of change of a command vehicle speed.

At step S18 subsequent to the affirmative determination at step S17, controller 8 calculates a limit value $\Delta v_{DW}$ of rate of change of command vehicle speed $V^*$ on the basis of host-vehicle speed $V_S$ and with reference to a limit-value calculation map shown in FIG. 6. The limit-value calculation map defines a characteristic line $L_{DW}$ such that limit value $\Delta v_{DW}$ is maintained at a relatively large negative value when host-vehicle speed $V_S$ is higher than maximum gradual-deceleration start speed $V_{DMAX}$, that limit value $\Delta V_{DW}$ gradually approaches zero according to the decrease of host-vehicle speed $V_S$ when host-vehicle speed $V_S$ is within a range between the predetermined value $V_R$ and maximum gradual-deceleration start speed $V_{DMAX}$ at which a gradual-deceleration control is started, and that limit value $\Delta V_{DW}$ is maintained at a value $\Delta v_{DMIN}$ near zero when host-vehicle speed $V_S$ is lower than control-cancel vehicle speed $V_R$. When the deceleration takes this value $\Delta V_{DMIN}$ near zero, the driver of host-vehicle 1 cannot sense the deceleration of host-vehicle 1.

At step S19, controller 8 determines whether or not a value obtained by subtracting a previous command vehicle speed $V^*(n-1)$ from a present command vehicle speed $V^*$ is smaller than limit value $\Delta v_{DW}$. When the determination at step S19 is affirmative ($V^*-V^*(n-1)<\Delta v_{DW}$), the routine proceeds to step S20. When the determination at step S19 is negative ($V^*-V^*(n-1) \geq \Delta v_{DW}$), the routine proceeds to step S23.

At step S20, controller 8 sets present command vehicle speed $V^*(n)$ at a value obtained by adding limit value $\Delta v_{DW}$ to previous command vehicle speed $V^*(n-1)$ ($V^*(n)=V^*(n-1)+\Delta v_{DW}$).

At step S21 subsequent to the execution of step S20, controller 8 determines whether or not host-vehicle speed $V_S$ is lower than or equal to maximum gradual-deceleration starting vehicle speed $V_{DMAX}$. When the determination at step S21 is affirmative ($V_S \leq V_{DMAX}$), the routine proceeds to step S22. When the determination at step S21 is negative ($V_S > V_{DMAX}$), the routine jumps to step S24.

At step S22, controller 8 outputs an alarm signal to an alarm circuit 9. Thereafter, the routine proceeds to step S24.

At step S23 subsequent to the negative determination at step S19, controller 8 sets present command vehicle speed $V^*(n)$ at command vehicle speed $V^*$. Thereafter, the routine jumps to step S24.

On the other hand, at step S25 subsequent to the negative determination at step S17, controller 8 determines whether or not the value obtained by subtracting the previous command vehicle speed $V^*(n-1)$ from the present command vehicle speed $V^*=V^*(n)$ is greater than a limit value $\Delta v_{UP}$ of rate of change of command vehicle speed during the vehicle acceleration. When the determination at step S25 is affirmative ($V^*-V^*(n-1)>\Delta v_{UP}$), the routine proceeds to step S26. When the determination at step S25 is negative ($V^*-V^*(n-1) \leq \Delta v_{UP}$), the routine proceeds to step S27.

At step S26 subsequent to the affirmative determination at step S25, controller 8 sets present command vehicle speed $V^*(n)$ at a value obtained by adding limit value $\Delta v_{UP}$ to previous command vehicle speed V*(n−1) (V*(n)=V*(n−1)+Δv$_{UP}$). Thereafter, the routine jumps to step S24.

At step S27 subsequent to the negative determination at step S25, controller 8 sets present command vehicle speed V*(n) at command vehicle speed V*. Thereafter, the routine jumps to step S24.

At step S24 subsequent to the execution of step S22, S23, S26 or S27, controller 8 outputs present command vehicle speed V*(n) to a vehicle speed control section 30.

After the execution of step S24, the routine returns to the inter-vehicle distance control process shown in FIG. 3.

In the processing of FIG. 4, the execution of steps S17 through S20, S23 and S24 corresponds to a deceleration gradual control means, and the execution of steps S21 and S22 and alarm circuit 9 correspond to an alarm means.

Figure 7:
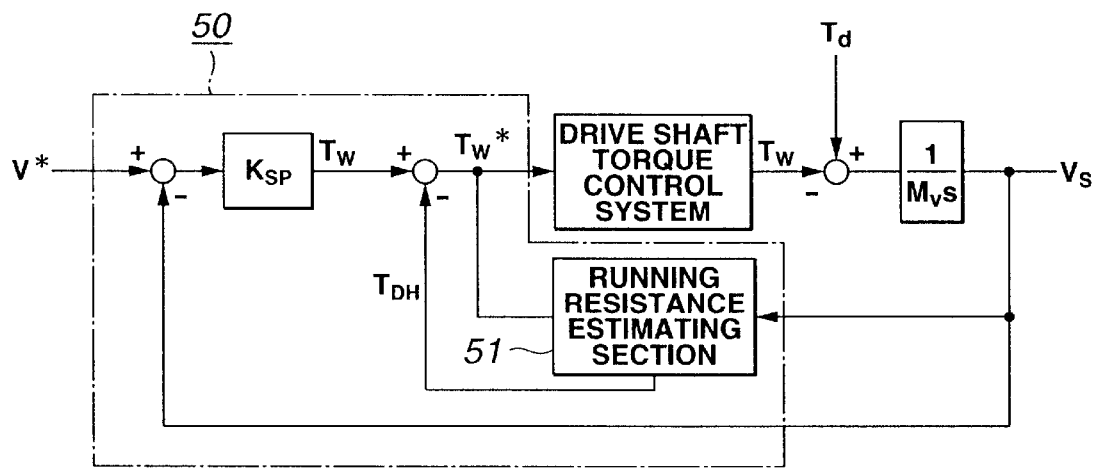
FIG. 7 is a block diagram showing a specific construction of a vehicle speed control section of FIG. 2.

Vehicle speed control section 50 calculates a command (target) drive-shaft torque $T_W$* employed for bringing host-vehicle speed $V_S$ closer to command vehicle speed V*(n) inputted. More specifically, as shown in FIG. 7, vehicle speed control section 50 calculates a drive shaft torque $T_W$ by multiplying a speed control gain $K_{SP}$ with a difference (V*−$V_S$) between command vehicle speed V* and host-vehicle speed $V_S$ and by subtracting a drive-shaft torque conversion value $T_{DH}$ of a running resistance from drive-shaft torque $T_W$. Herein, drive-shaft torque conversion value $T_{DH}$ of the running resistance is calculated at running resistance estimating section 51 on the basis of command drive-shaft torque $T_W$* and host-vehicle speed $V_S$ from the following expression (3):

$$T_{DH}=H(s)\cdot R_W\cdot M_V\cdot s\cdot V_S - H(s)\cdot T_W^* \quad (3)$$

where $M_V$ is a vehicle weight, and $R_W$ is a radius of a tire of the vehicle.

By feedbacking drive-torque conversion value $T_{DH}$ of the running resistance, it becomes possible to eliminate the effects of a road gradient, an air resistance and the running resistance.

On the presumption that a disturbance to the control system is eliminated by executing this running resistance estimating process, a transfer function from command vehicle speed V* to host-vehicle speed $V_S$ is represented by the following expression (4):

$$V_S=(K_{SP}/M_V)V^*/(s+K_{SP}/M_V). \quad (4)$$

By properly setting vehicle speed control gain $K_{SP}$ at a proper value, it becomes possible to correspond a response characteristic of the vehicle speed control system at a desired characteristic.

Drive shaft torque control section 60 calculates command throttle opening θ* and command brake hydraulic pressure $P_B$* by which command drive-shaft torque $T_W$* calculated at vehicle speed control section 50 is achieved. More specifically, a relationship between drive-shaft torque $T_W$ and engine torque $T_E$ is represented by the following expression (5):

$$T_W=R_T R_{AT} R_{DEF}\{T_E-J_E(dN_E/dt)\}-T_{BR} \quad (5)$$

where $R_T$ is an amplifier ratio of a torque converter, $R_{AT}$ is a gear ratio of automatic transmission 4, $R_{DEF}$ is a gear ratio of a differential gear, $J_E$ is an engine inertia, $N_E$ is an engine speed, and $T_{BR}$ is a brake torque.

Figure 9:
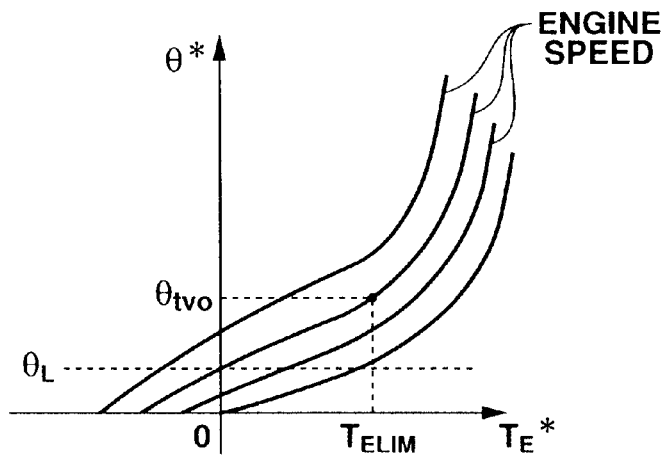
FIG. 9 is an engine performance map from which a throttle opening is obtained according to an engine torque.

Accordingly, command throttle opening θ* is obtained by calculating a command engine torque $T_E$* relative to command drive-shaft torque $T_W$* from the following expression (6) and by retrieving command throttle opening θ* needed for generating a command engine torque $T_E$* from an engine performance map shown in FIG. 9.

$$T_E^*=J_E(dN_E/dt)+T_W^*/R_T R_{AT} R_{DEF}. \quad (6)$$

If command throttle opening θ* is greater than or equal to zero (θ*≧0), command drive shaft torque $T_W$* is achieved only by the engine torque without employing brake actuators 5. On the other hand, if command throttle opening θ* is smaller than zero (θ*<0), the throttle opening is set at zero, and a brake operation quantity for bringing drive-shaft torque $T_W$ closer to command drive-shaft torque $T_W$* while taking account of engine torque $T_E$.

Accordingly, a distribution rule of command engine torque $T_E$* and command brake torque $T_B$* is classified as follows:

(A) When θ*>0, $$T_B^*=0 \quad (7)$$

$$T_W=R_T R_{AT} R_{DEF}\{T_E-J_E(dN_E/dt)\}. \quad (8)$$

Accordingly, engine torque $T_E$ obtained from the following expression (9) may be generated in response to command drive-shaft torque $T_W$*:

$$T_E=J_E(dN_E/dt)+T_W^*/R_T R_{AT} R_{DEF}. \quad (9)$$

(B) When θ*=0, and when $T_{ELIM}$ represents engine torque $T_E$ at a condition that throttle opening θ is zero, the expression (5) is represented by the following expression (10):

$$T_W=R_T R_{AT} R_{DEF} T_{ELIM}-T_B^*. \quad (10)$$

Accordingly, command brake torque obtained from the following expression (11) may be generated in response to command drive shaft torque $T_W$*:

$$T_B^*=-T_W^*+R_T R_{AT} R_{DEF} T_{ELIM}. \quad (11)$$

Command brake hydraulic $P_B$* corresponding to a brake control quantity relative to command brake torque $T_B$* is represented by the following expression (12):

$$P_B^*=T_B^*/8A_B R_B \mu_B \quad (12)$$

where $A_B$ is a brake cylinder area, $R_B$ is a rotor effective radius, and a pad friction coefficient $\mu_B$.

Figure 8:
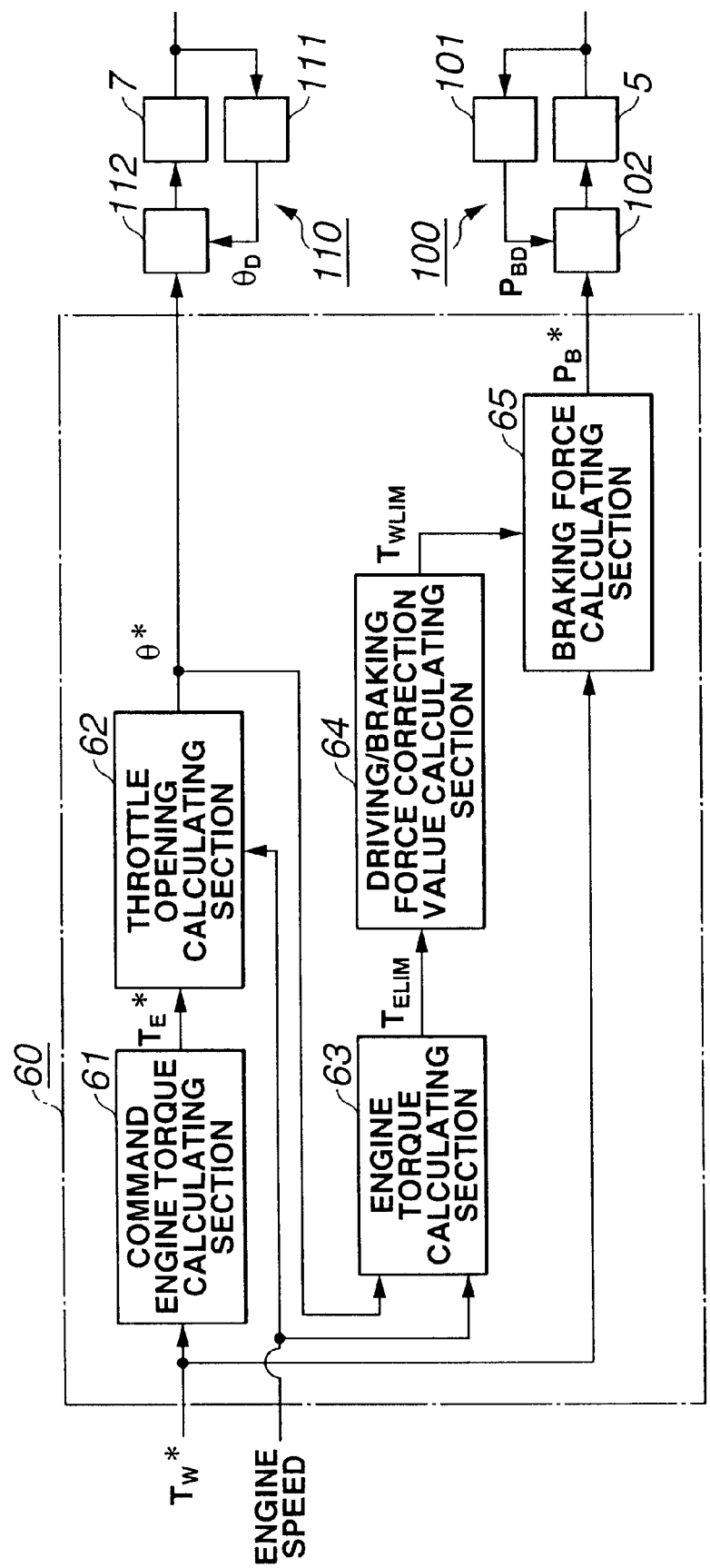
FIG. 8 is a block diagram showing a specific construction of a drive shaft torque control section of FIG. 2.

Accordingly, as shown in FIG. 8, command drive shaft torque $T_W$* is supplied to command engine torque calculating section 61. Command engine torque $T_E$* is calculated from the expression (6) and is supplied to throttle opening calculating section 62. At throttle opening calculating section 62, command throttle opening θ* is obtained from the engine performance map representative of a relationship between command engine torque $T_E$* and command throttle opening θ* while employing engine speed as a parameter as shown in FIG. 9. The obtained command throttle opening θ* is outputted to a throttle-opening servo system 110.

Figure 10:
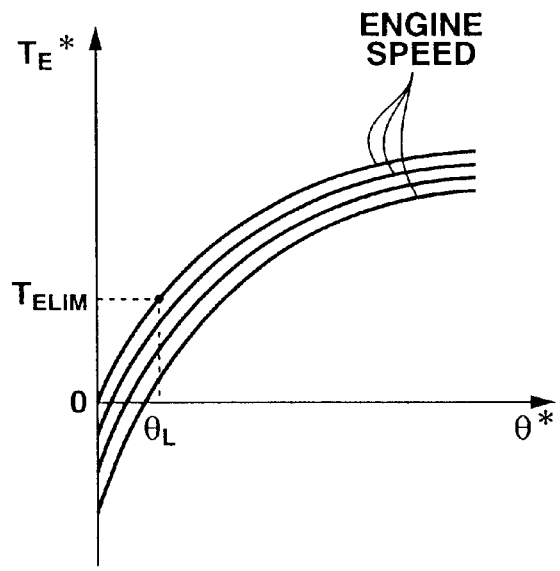
FIG. 10 is an engine performance map from which the engine torque is obtained according to the throttle opening.

On the other hand, engine torque $T_{ELIM}$ employed under a condition that throttle opening is zero is calculated at engine torque calculating section 63 on the basis of command throttle opening θ* and engine speed $N_E$ and with reference to the engine performance map shown in FIG. 10. The obtained engine torque $T_{ELIM}$ is supplied to driving/braking force correction value calculating section 64. Driving/braking force correction value $T_{WLIM}$ ($T_{WLIM}=R_T R_{AT} R_{DEF} T_{ELIM}$) is calculated at driving/braking force correction value calculating section 64 by executing the calculation of the second term of the right side of the expression (11). This obtained driving/braking force correction value $T_{WLIM}$ is supplied to braking force calculating section 65. Command brake torque $T_B^*$ is calculated at braking force calculating section 65 by subtracting command drive shaft torque $T_W^*$ from the driving/braking force correction value $T_{WLIM}$. Further, command brake hydraulic pressure $P_B^*$ is calculated at braking force calculating section 65 by executing the calculation of the expression (12) and is outputted to brake hydraulic pressure servo system 100. Under a condition that there is no preceding vehicle ahead of host-vehicle 1, command brake hydraulic pressure $P_B^*$ is set at zero, and the braking control is executed only by controlling the engine torque $T_E$ of host-vehicle 1.

As shown in FIG. 8, in brake hydraulic pressure servo system 100, brake actuator 5 is feedback controlled on the basis of the difference between command brake hydraulic pressure $P_B^*$ and an actual brake hydraulic pressure $P_{BD}$ detected by brake hydraulic pressure sensor 101. On the other hand, command throttle opening $\theta^*$ is supplied from drive shaft torque control section 60 to throttle opening servo system 110. In throttle opening servo system 110, throttle actuator 7 is feedback controlled on the basis of the difference between command throttle opening $\theta^*$ and an actual throttle opening $\theta_D$ detected by a throttle opening sensor 111.

Vehicle speed control section 50 and drive-shaft torque control section 60 constructs driving/braking force control means.

Next, operation of the first embodiment of ACC system according to the present invention will be discussed.

Now, it is assumed that host-vehicle 1 follows a preceding-vehicle on an urban flat road while keeping a proper aimed inter-vehicle distance therebetween. Under this condition, if it is assumed that the preceding-vehicle travels at a constant vehicle speed, actual inter-vehicle distance L detected by inter-vehicle distance sensor 2 is maintained at target inter-vehicle distance $L^*$, and command vehicle speed $V^*(n)$ calculated in inter-vehicle distance calculating section 40 from the expression (2) becomes nearly equal to host-vehicle speed $V_S$. Therefore, vehicle speed control section 50 calculates command drive-shaft torque $T_W^*$ for maintaining host-vehicle speed $V_S$ according to the difference between command vehicle speed $V^*(n)$ and host-vehicle speed $V_S$. Drive shaft torque control section 60 receives the calculated command drive-shaft torque $T_W^*$, and command engine torque calculating section 61 in drive shaft torque control section 60 calculates command engine torque $T_E^*$. Throttle opening calculating section 62 in drive shaft torque control section 60 calculates command throttle opening $\theta^*$ of a positive value ($\theta^* > 0$) according to command engine torque $T_E^*$. The obtained command throttle opening $\theta^*$ is supplied to throttle opening servo system 110. Therefore, the throttle opening is controlled at a proper value by means of throttle actuator 7, and a constant speed cruise control is maintained while target inter vehicle distance $L^*$ is maintained.

During this constant-speed cruise control, since command throttle opening $\theta^*$ takes a positive value ($\theta^* > 0$), command brake torque $T_B^*$ takes zero ($T_B^* = 0$). Command brake torque $T_B^*$ is outputted to brake servo system 100, and therefore brake actuator 5 controls the brake hydraulic pressure at zero, that is, brake actuator 5 is put in an inoperative condition.

If host-vehicle 1 is decelerated in response to the braking operation of the preceding vehicle under the inoperative condition of brake actuator 5, actual inter-vehicle distance L detected by inter-vehicle distance sensor 2 is shortened, and therefore command vehicle speed $V^*(n)$ calculated at inter-vehicle distance section 40 takes a value which is smaller than host-vehicle speed $V_S$. Accordingly, command drive shaft torque $T_W^*$ calculated at vehicle speed control section 50 takes a negative value.

Command engine torque $T_E^*$, which is calculated at engine torque calculating section 61 of drive shaft torque calculating section 60, also takes a negative value. Therefore, command throttle opening $\theta^*$, which is calculated with reference to the engine performance map of FIG. 9, takes zero ($\theta^* = 0$), and throttle actuator 7 controls the actual throttle opening at zero ($\theta_D = 0$).

On the other hand, since command drive-shaft torque $T_E^*$ takes a negative value, command brake torque $T_B^*$, which is calculated at braking force calculating section 65 by adding command drive shaft torque $T_W^*$ and driving/braking force correction value $T_{WLIM}$ calculated at driving/braking force correction value calculating section 64 on the basis of engine brake torque $T_{ELIM}$ calculated at engine torque calculating section 63, takes a positive value. Command brake hydraulic pressure $P_B^*$ calculated according to command brake torque $T_B^*$ takes a value corresponding to the deceleration of the preceding vehicle. Command brake hydraulic pressure $P_B^*$ is outputted to brake hydraulic pressure servo system 100, and therefore host-vehicle 1 is put in a decelerating condition according to the deceleration of the preceding vehicle.

When host-vehicle speed $V_S$ becomes lower than predetermined low vehicle speed $V_L$ shown in FIG. 5 by continuing this decelerating condition of host-vehicle 1, target time gap $T_H^*$ is gradually increased from an ordinary value $T_{HU}$ according to the decrease of host-vehicle speed $V_S$. In response to this increase of target time gap $T_H^*$, target inter-vehicle distance $L^*$, which is calculated from the expression (1) by executing the step S13 of FIG. 4, is set at a longer distance as compared with that in an ordinary cruising condition.

Therefore, when inter-vehicle distance L is gradually increased according to the increase of the target inter-vehicle distance $L^*$ and when host-vehicle speed $V_S$ reaches gradual-deceleration start maximum speed $V_{DMAX}$, target time gap $T_H^*$ reaches a control-cancel set value $T_{HR}$ which is greater than ordinary value $T_{HU}$, and is maintained at control-cancel set value $T_{HR}$ even if host-vehicle speed $V_S$ is decreased later. Accordingly, inter-vehicle distance L is controllably set at a longer distance as compared with that of the ordinary cruising condition.

Thus, when host-vehicle speed $V_S$ becomes lower than or equal to gradual-deceleration starting maximum speed $V_{DMAX}$, limit value $\Delta v_{DW}$, which is calculated at step S18 in FIG. 4, gradually approaches zero from maximum value $\Delta V_{DMAX}$ of a negative value according to the decrease of host-vehicle speed $V_S$ as shown in FIG. 6. When a value $\Delta V^*$ indicative of the rate of change of command vehicle speed $V^*$, which is obtained by subtracting previous command vehicle speed $V^*(n-1)$ from command vehicle speed $V^*$ calculated at step S15, is greater than or equal to limit value $\Delta v_{DW}$ ($\Delta V^* = V^* - V^*(n-1) \geq \Delta v_{DW}$), the routine in the flowchart of FIG. 4 proceeds from step S19 to step S23 wherein present command vehicle speed $V^*(n)$ is set at command vehicle speed $V^*$ calculated at step S15 and is outputted to vehicle speed control section 50. Therefore, the deceleration of host-vehicle 1 is maintained.

When this deceleration condition is maintained, limit value $\Delta v_{DW}$ approaches zero according to the decrease of host-vehicle speed $V_S$. Therefore, when value $\Delta V^*$ indicative of the rate of change of command vehicle speed $V^*$ is smaller than limit value $\Delta v_{DW}$ ($\Delta V^* = V^* - V^*(n-1) < \Delta v_{DW}$), the routine in the flowchart of FIG. 4 proceeds from step S19 to step S20 wherein a value obtained by adding previous command vehicle speed V*(n−1) and limit value $\Delta v_{DW}$ is employed as present command vehicle speed (V*(n)=V*(n−1)+$\Delta v_{DW}$). This arrangement limits a deceleration quantity of command vehicle speed V*(n).

Therefore, command drive-shaft torque $T_W^*$ calculated at vehicle speed control section 50 decreases and command brake hydraulic pressure $P_B^*$ calculated at drive shaft torque control section 60 also decreases according to the decrease of command drive shaft torque $T_W^*$. As a result, the braking force generated by brake actuator 5 is also decreased and the deceleration of host-vehicle 1 is decreased.

When the deceleration is in a loosened condition, host-vehicle speed $V_S$ is lower than or equal to maximum gradual-deceleration starting speed $V_{DMAX}$. Therefore, the routine of the flowchart in FIG. 4 proceeds from step S21 to step S22 wherein controller 8 outputs the alarm signal to alarm circuit 9 so that alarming sound is generated or alarming information is displayed by alarm circuit 9 in order to inform the driver that host-vehicle 1 is put in a gradual deceleration condition.

Thereafter, when the decrease of host-vehicle speed $V_S$ is continued, command vehicle speed V* calculated at step S15 is largely limited by limit value $\Delta v_{DW}$ of rate of change of command vehicle speed V*. Therefore, the braking force generated by brake actuator 5 is also decreased and the deceleration of host-vehicle 1 is decreased (loosened).

Since limit value $\Delta v_{DW}$ becomes nearly zero at a moment just before host-vehicle speed $V_S$ reaches control-cancel vehicle speed $V_R$, present command vehicle speed V*(n) calculated at step S20 becomes nearly equal to previous command vehicle speed V*(n−1). In response to this, command brake hydraulic pressure $P_B^*$ calculated at drive shaft torque control section 60 takes a value near zero. Accordingly, the deceleration of host-vehicle 1 is put in a nearly zero acceleration/deceleration condition in that the driver of host-vehicle 1 cannot sense the deceleration.

Thereafter, when host-vehicle speed $V_S$ reaches control-cancel vehicle speed $V_R$, the routine of the flowchart in FIG. 3 proceeds from step S3 to step S4 wherein control-condition flag F is reset (F=0). Accordingly, when the process shown in FIG. 3 is subsequently executed, the routine proceeds from step S1 to step S5 wherein it is determined whether host-vehicle speed $V_S$ is higher than or equal to control-start vehicle speed $V_{CS}$ ($V_{CS}=V_R+\Delta V_R$) obtained by adding control-cancel vehicle speed $V_R$ and predetermined value $\Delta V_R$.

When the determination at step S5 is negative ($V_S<V_{CS}$), this present time-interruption process is terminated. Accordingly, the command vehicle speed calculation process is canceled, and a driver directly controls host-vehicle 1.

Under this condition, it is possible for the driver to execute the control of host-vehicle 1 with sufficient lead time by previously setting control-cancel vehicle speed $V_R$ at a low speed nearly equal to a vehicle stop state. Further, since inter-vehicle distance L under this condition is set at a longer distance as compared with that of the ordinary cruising, the driver can execute driving host-vehicle 1 with further sufficient lead time.

Thereafter, inter-vehicle distance L is increased by the acceleration of host-vehicle 1 or a lane-change after host-vehicle 1 is temporally stopped by the operation of the driver or runs at a low vehicle speed smaller than control-cancel vehicle speed $V_R$. Further, when host-vehicle speed $V_S$ becomes higher than or equal to control-start vehicle speed $V_{CS}$ which is obtained by adding a predetermined value $\Delta V_R$ to control-cancel vehicle speed $V_R$ ($V_S \geq V_{CS}=V_R+\Delta V_R$), the routine of the flowchart of FIG. 3 proceeds from step S5 to step S6 wherein control-condition flag F is set at 1 (F=1).

Therefore, when the processing of FIG. 3 is subsequently executed, the routine proceeds from step S1 to step S2 so that the command vehicle speed calculating process is restarted.

In this routine, it is presumed that inter-vehicle distance sensor 2 has detected a preceding vehicle. When inter-vehicle distance sensor 2 detects another preceding vehicle ahead of the previously detected preceding vehicle as a result that the previously detected preceding vehicle continues the acceleration or executes a lane change, inter-vehicle distance L becomes smaller than target inter-vehicle distance L* calculated at step S13. Therefore, at step S15, controller 8 calculates command vehicle speed V* which is higher than a previous command vehicle speed V*(n−1).

Accordingly, the negative determination is made at step S17, and the routine proceeds to step S25 wherein controller 8 determines whether or not the value obtained by subtracting the previous command vehicle speed V*(n−1) from the present command vehicle speed V* calculated at step S15 is greater than limit value $\Delta v_{UP}$. When the determination at step S25 is affirmative, the routine proceeds to step S26 wherein controller 8 sets present command vehicle speed V*(n) at a value obtained by adding limit value $\Delta v_{UP}$ to previous command vehicle speed V*(n−1) (V*(n)=V*(n−1)+$\Delta v_{UP}$). Thereafter, the determined command vehicle speed V*(n) is outputted to speed control section 50. As a result, command drive torque $T_W^*$ of a positive value is calculated and is supplied to drive shaft torque control section 60. Command engine torque calculating section 61 calculates command engine torque $T_E^*$ according to command drive torque $T_W^*$. Throttle opening calculating section 62 receives the calculated command drive torque $T_W^*$ and calculates command throttle opening $\theta^*$. The obtained command throttle opening $\theta^*$ is supplied to throttle actuator 7 through throttle opening control system 100, and therefore the acceleration control is executed while the acceleration is limited.

When the value obtained by subtracting the previous command vehicle speed V*(n−1) from the present command vehicle speed V*=V*(n) is smaller than limit value $\Delta V_{UP}$, that is, when the determination at step S25 is negative, the routine proceeds to step S27 wherein command vehicle speed V* is directly employed as present command vehicle speed V*(n). Vehicle speed control section 50 receives the obtained present command vehicle speed V*(n) and executes the acceleration control.

Further, when the detected preceding vehicle continues the acceleration or executes a lane change and when inter-vehicle distance sensor 2 detects no preceding vehicle ahead of the previously detected preceding vehicle, the routine of the flowchart of FIG. 4 proceeds from step S14 to step S16 wherein command vehicle speed V* is set at a set vehicle speed $V_{SS}$, which is previously set by a driver (V*=$V_{SS}$). Since no preceding vehicle is detected under this condition, command vehicle speed V* set at step S16 is considerably greater than previous command vehicle speed V* (n−1). Accordingly, the affirmative determination is made at step S25 after the negative determination was made at step S17. The routine proceeds to step S26 wherein controller 8 sets present command vehicle speed V*(n) at the value obtained by adding limit value $\Delta v_{UP}$ to previous command vehicle speed V*(n−1) (V*(n)=V*(n−1)+$\Delta v_{UP}$). Thereafter, the obtained command vehicle speed V*(n) is outputted to vehicle speed control section 50 wherein the acceleration control is executed while the acceleration is limited.

When the no-preceding-vehicle existing condition is maintained and when host-vehicle speed $V_S$ becomes higher than set vehicle speed $V_{SS}$, command vehicle speed $V^*$ is set at set vehicle speed $V_{SS}$ by the processing of FIG. 4. However, the value, which is obtained at vehicle speed control section 50 by subtracting host-vehicle speed $V_S$ from command vehicle speed $V^*$, takes a negative value. Accordingly, command drive shaft torque $T_W^*$ of a negative value is obtained according to the negative difference between host-vehicle speed $V_S$ and command vehicle speed $V^*$. Driving/braking force correction value calculating section 64 calculates torque correction value $T_{WLIM}$. Braking force calculating section 65 receives torque correction value $T_{WLIM}$ and calculates command brake hydraulic pressure $P_B^*$. Under this condition that there is no preceding vehicle, command brake hydraulic pressure $P_B^*$ is set at zero ($P_B^* = 0$) and therefore an inoperative condition of brake actuator 5 is maintained. However, command throttle opening $\theta^*$ calculated at throttle opening calculating section 62 takes a small value. Accordingly, a braking force due to engine brake is generated, and host-vehicle speed $V_S$ is gradually decelerated to the set vehicle speed $V_{SS}$. This arrangement improves ride comfort of host-vehicle 1.

Figure 11A:
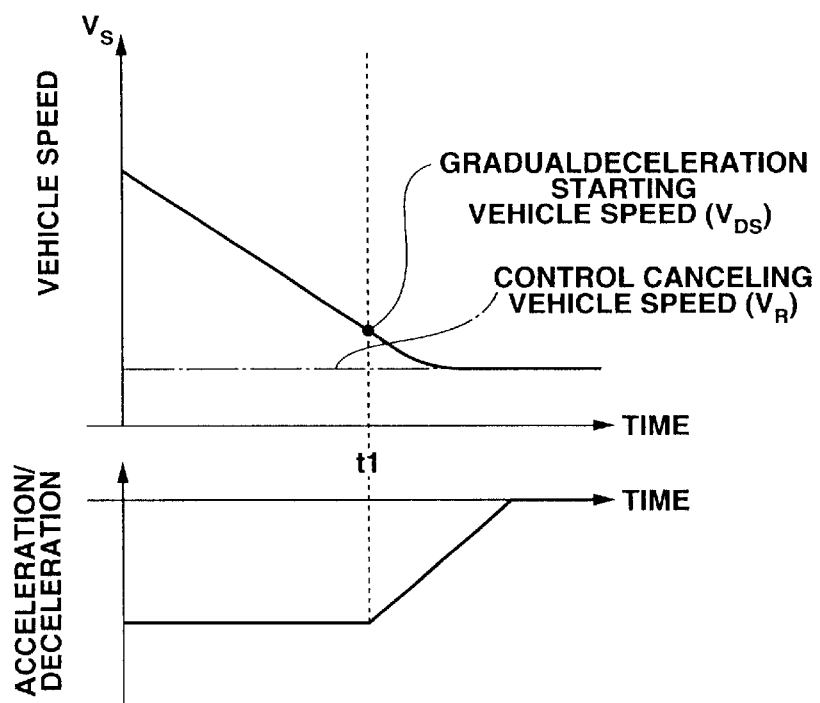
FIGS. 11A and 11B are graphs showing characteristic lines employed in explaining the operation of ACC system of the first embodiment.

As discussed above, the first embodiment according to the present invention is arranged such that the change of command vehicle speed $V^*$ is limited by limit value $\Delta v_{DW}$ of the rate of change of command vehicle speed $V^*$ and that the limit value $\Delta v_{DW}$ is increased from a negative value to zero according to the decrease of host-vehicle speed $V_S$ as shown in FIG. 6. Accordingly, when host-vehicle speed $V_S$ is decelerated toward control-cancel vehicle speed $V_R$ by a small deceleration as shown in FIG. 11A, a decreased quantity of command vehicle speed $V^*$ calculated at step S15 relative to previous command vehicle speed $V^*(n-1)$ is small. Therefore, the gradual deceleration control is started at a first moment t1 when limit value $\Delta v_{DW}$ becomes sufficiently large, that is, when host-vehicle speed $V_S$ approaches a vehicle speed near control-cancel vehicle speed $V_R$.

Figure 11B:
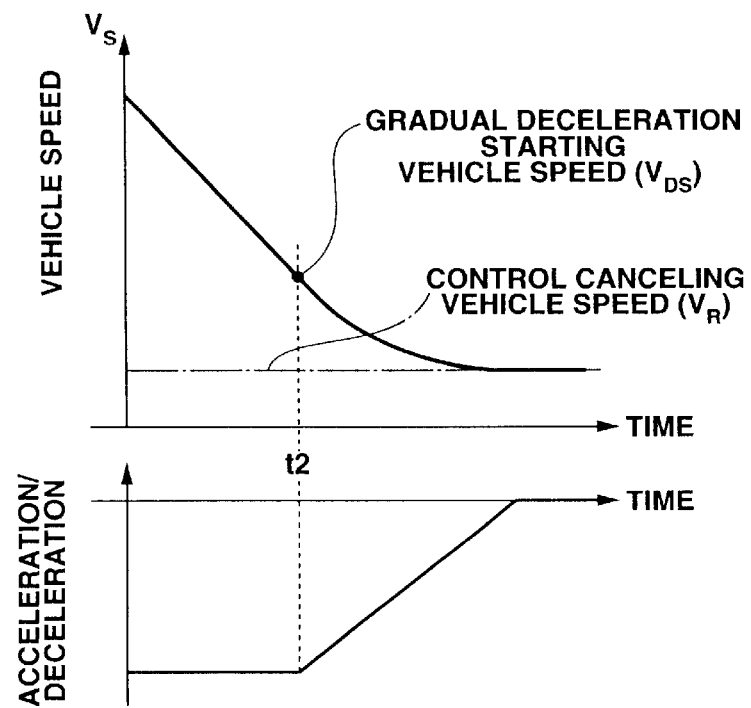

On the other hand, when host-vehicle speed $V_S$ is decelerated toward control-cancel vehicle speed $V_R$ by a large deceleration as shown in FIG. 11B, the decreased quantity of command vehicle speed $V^*$ calculated at step S15 relative to previous command vehicle speed $V^*(n-1)$ is large. Therefore, the gradual deceleration control is started at a second moment t2 when limit value $\Delta v_{DW}$ yet takes a small value before the first moment t1, that is, when host-vehicle speed $V_S$ is considerably larger than control-cancel vehicle speed $V_R$.

As a result, gradual-deceleration starting vehicle speed $V_{DS}$ is automatically varied according to a magnitude of the deceleration of host-vehicle speed $V_S$ toward control-cancel vehicle speed $V_R$, and therefore it is possible to accurately control the deceleration at a nearly zero when host-vehicle $V_S$ is at control-cancel vehicle speed $V_R$ regardless the magnitude of deceleration. This arrangement certainly prevents the driver from having abnormal feeling during this deceleration when the following control is cancelled.

Although the first embodiment according to the present invention has been shown and described such that limit value $\Delta v_{DW}$ is calculated with reference to the limit value calculation map of FIG. 6 and that the rate of change of command vehicle speed $V^*$ is suppressed by this limit value $\Delta v_{DW}$, the present invention is not limited to this arrangement and may be arranged such that gradual-deceleration starting vehicle speed $V_{DS}$, by which the deceleration at control-cancel vehicle speed $V_R$ becomes nearly zero, is obtained on a presumption that a loosened rate of the deceleration is set at a constant value on the basis of the deceleration during the decelerating condition toward the control-cancel vehicle speed $V_R$, and that the gradual deceleration control is executed by a constant gradual deceleration rate at a moment that host-vehicle speed $V_S$ reaches gradual-deceleration starting vehicle speed $V_{DS}$.

Furthermore, although the first embodiment according to the present invention has been shown and described such that limit value $\Delta v_{DW}$ is calculated from host-vehicle speed $V_S$ with reference to the limit value calculation map representative of a relationship between host-vehicle speed $V_S$ and limit value $\Delta v_{DW}$ as shown in FIG. 6, the present invention is not limited to this and may be arranged such that a limit-value calculation map representative of a relationship between command vehicle speed $V^*$ and limit value $\Delta v_{DW}$ has been previously obtained and that limit value $\Delta v_{DW}$ may be calculated based on command vehicle speed $V^*$ calculated at step S15 and with reference to this limit-value calculation map.

Figure 12:
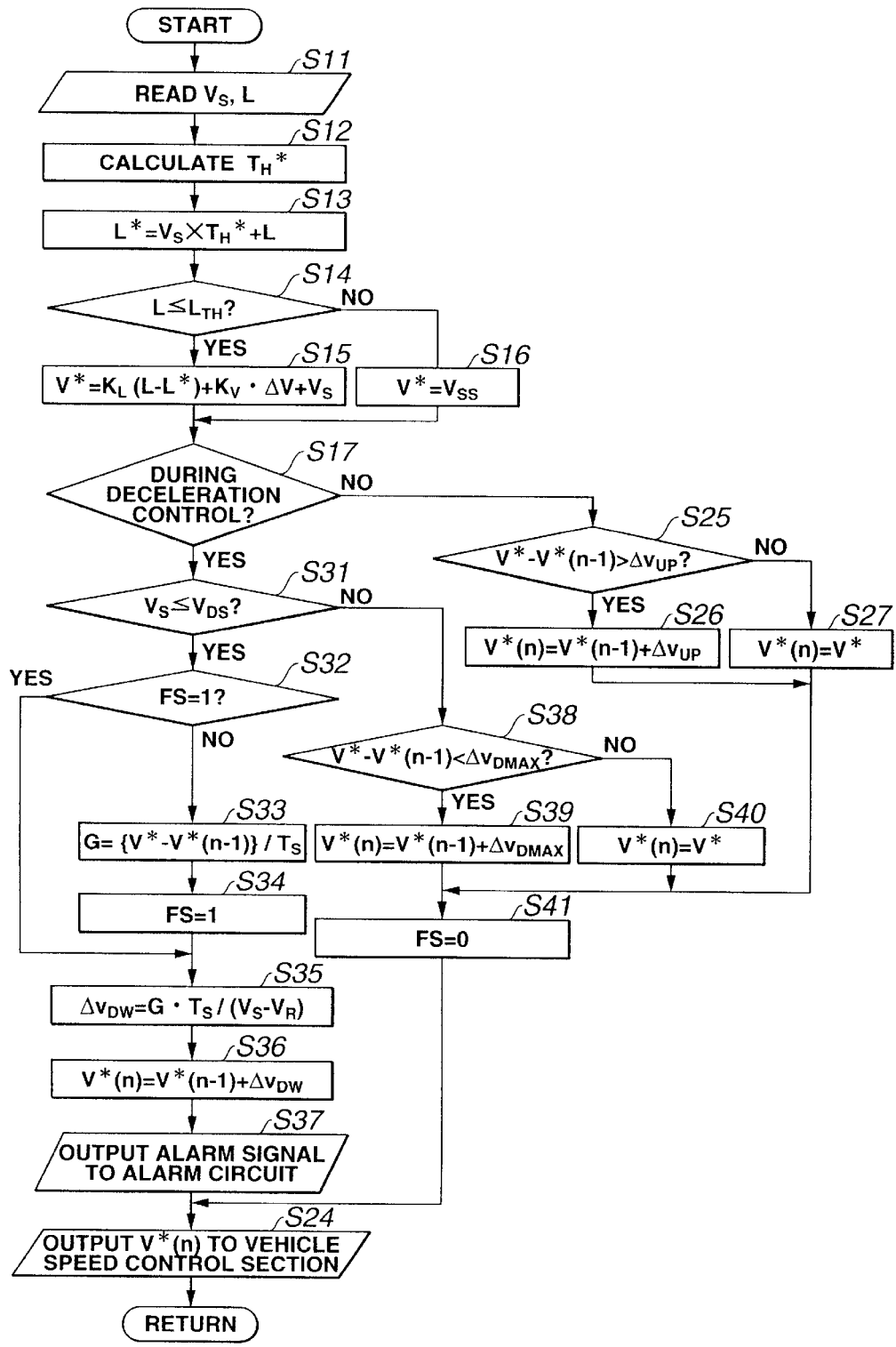
FIG. 12 is a flowchart showing a command vehicle speed calculation process employed in a second embodiment of the present invention.
Figure 13:
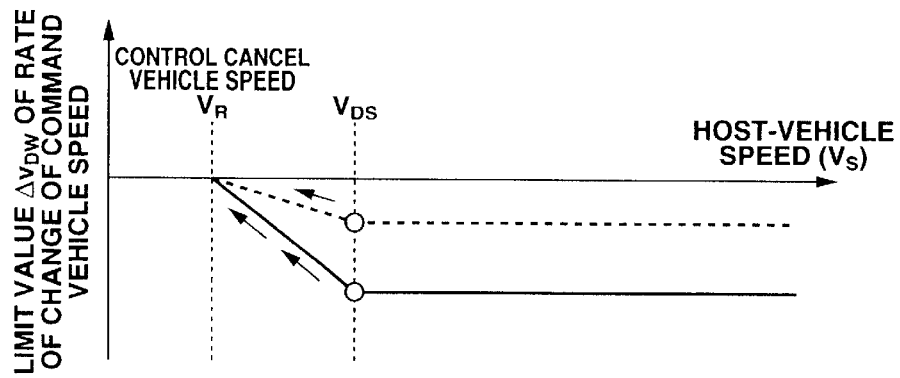
FIG. 13 is a graph showing a characteristic line employed for explaining the operation of ACC system of the second embodiment.

Referring to FIGS. 12 and 13, there is shown a second embodiment of ACC system according to the present invention. The second embodiment is arranged such that the gradual-deceleration starting vehicle speed relative to control-cancel vehicle speed $V_R$ is set constant, a rate of change of the deceleration is set according to the deceleration at the gradual-deceleration starting vehicle speed so that the deceleration at control-cancel vehicle speed $V_R$ is controlled at nearly zero. The basic construction of the second embodiment is the same as that of the first embodiment shown in FIGS. 1 and 2.

The second embodiment is specifically arranged such that the command vehicle speed calculating process executed at inter-vehicle distance control section 40 shown in FIG. 12 is basically the same as that of the first embodiment shown in FIG. 4, except that steps S18 through S23 are omitted and are changed into the later discussed steps S31 through S41. The other steps of FIG. 12 are denoted by the same reference numerals of FIG. 4, and the explanation thereof is omitted herein.

More specifically, when the determination at step S17 is affirmative, that is, when the deceleration control is being executed, the routine of FIG. 12 proceeds to step S31 wherein controller 8 determines whether or not host-vehicle speed $V_S$ is lower than or equal to gradual-deceleration starting vehicle speed $V_{DS}$. When the determination at step S31 is affirmative ($V_S \leq V_{DS}$), the routine proceeds to step S32. When the determination at step S31 is negative ($V_S > V_{DS}$), the routine jumps to step S38.

At step S32, controller 8 determines whether an initial-condition flag FS is set at 1 or not. When the determination at step S32 is affirmative (FS=1), the routine jumps to step S35. When the determination at step S32 is negative (FS=0), the routine proceeds to step S33.

At step S33, controller 8 calculates the deceleration G on the basis of present host-vehicle speed $V_S(n)$ and previous host-vehicle speed $V_S(n-1)$ and from the following expression (13):

$$G = \{V_S(n) - V_S(n-1)\}/T_S \qquad (13)$$

where $T_S$ is a sampling time representative of a timer interruption cycle period.

At step S34, controller 8 sets initial-condition flag FS at 1 (FS=1).

At step S35 subsequent to the execution of step S34 of the affirmative determination at step S32, controller 8 calculates limit value $\Delta v_{DW}$ of rate of change of command vehicle speed $V^*$ by executing calculation of the following expression (14):

$$\Delta v_{DW} = G \times T_S / (V_S - V_R). \quad (14)$$

At step S36, controller 8 calculates present command vehicle speed V*(n) by adding suppression value $\Delta v_{DW}$ to previous command vehicle speed V*(n−1) as shown by the following expression (15):

$$V^*(n) = V^*(n-1) + \Delta v_{DW} \quad (15)$$

At step S37, controller 8 outputs an alarm signal to alarm circuit 9. Thereafter, the routine proceeds to step S24.

On the other hand, at step S38 subsequent to the negative determination at step S31, controller 8 determines whether or not a value obtained by subtracting previous command vehicle speed V*(n−1) from command vehicle speed V* calculated at step S15 is smaller than the previously set limit value $\Delta v_{DMAX}$. When the determination at step S38 is affirmative (V*−V*(n−1)<$\Delta v_{DMAX}$), the routine proceeds to step S39 wherein present command vehicle speed V*(n) is set at a value obtained by adding limit value $\Delta v_{DMAX}$ to previous command vehicle speed V*(n−1). When the determination at step S38 is negative (V*−V*(n−1)≧$\Delta_{DMAX}$), the routine proceeds to step S40 wherein present command vehicle speed V*(n) is set at command vehicle speed V* calculated at step S15.

At step S41 after the execution of step S26, S27, S39 or S40, controller 8 sets initial-condition flag FS at 0 (FS=0). Thereafter, the routine proceeds to step S24.

In the processing of FIG. 12, the processing of steps S17, S24, S31 through S36 correspond to a gradual-deceleration control means, and the processing of step S37 and alarm circuit 9 correspond to an alarm means.

In this second embodiment, it is assumed that when host-vehicle 1 is following a preceding vehicle and when inter-vehicle distance L is suddenly shortened due to the deceleration of the preceding condition under a condition that FS=0, host-vehicle 1 is decelerated by a relatively large deceleration shown by a continuous line of FIG. 13 and this deceleration condition of host-vehicle 1 is maintained.

Under this deceleration maintained condition, when host-vehicle speed $V_S$ is higher than gradual-deceleration starting speed $V_{DS}$, the routine of FIG. 12 proceeds from step S31 to step S38 wherein it is determined whether or not the value obtained by subtracting previous command vehicle speed V*(n−1) from command vehicle speed V* calculated at step S15 is smaller than the previously set limit value $\Delta v_{DMAX}$. When the determination at step S38 is negative (V*−V*(n−1)≧$\Delta v_{DMAX}$), controller 8 sets present command vehicle speed V*(n) at command vehicle speed V* calculated at step S15. Further, by outputting present command vehicle speed V*(n) to speed control section 50, controller 8 executes the deceleration control.

When the determination at step S38 is affirmative (V*−V*(n−1)<$\Delta v_{DMAX}$), controller 8 sets present command vehicle speed V*(n) at the sum of previous command vehicle speed V*(n−1) and lower limit value $\Delta v_{DMAX}$. Further, by outputting present command vehicle speed V*(n) to speed control section 50, controller 8 executes the deceleration control while the change of the deceleration is limited.

When host-vehicle speed $V_S$ becomes lower than or equal to gradual-deceleration starting vehicle speed $V_{DS}$ after the relatively steep deceleration control is continued as shown by a continuous line of FIG. 13, the routine of FIG. 12 proceeds from step S31 to step S32. Since initial-condition flag FS has been reset at zero (FS=0), the routine proceeds to step S33 wherein deceleration G at this moment is calculated. Then, initial-condition flag FS is set at 1 (FS=1).

Further, controller 8 calculates limit value $\Delta v_{DW}$ of rate of change of command vehicle speed V* by executing the calculation of the expression (14) on the basis of deceleration G calculated at step S33. Controller 8 further calculates present command vehicle speed V*(n) by adding limit value $\Delta v_{DW}$ to previous command vehicle speed V*(n−1). Furthermore, controller 8 outputs the alarm signal to alarm circuit 9 to inform the driver that gradual deceleration control has started, and outputs present command vehicle speed V*(n) to vehicle speed control section 50.

During this processing, limit value $\Delta v_{DW}$ is calculated on the basis of present host-vehicle speed $V_S$, control-cancel vehicle speed $V_R$ and deceleration G at the moment when host-vehicle speed $V_S$ reaches gradual-deceleration starting vehicle speed $V_{DS}$, from the expression (14). Accordingly, limit value $\Delta v_{DW}$ gradually approaches zero as host-vehicle speed $V_S$ approaches control-cancel vehicle speed $V_R$, as shown by continuous line of FIG. 13. Then, when host-vehicle speed $V_S$ reaches control-cancel vehicle speed $V_R$, limit value $\Delta v_{DW}$ takes a value nearly equal to zero.

Consequently, such an arrangement for setting the deceleration at a value near zero when host-vehicle speed $V_S$ reaches control-cancel vehicle speed $V_R$, as is similar to the arrangement of the first embodiment, certainly prevents the driver from having abnormal feeling during this deceleration when the following control is cancelled.

On the other hand, even if the deceleration G during the deceleration control is small and when host-vehicle speed $V_S$ becomes lower than or equal to gradual-deceleration starting vehicle speed $V_{DS}$, limit value $\Delta v_{DW}$ is gradually deceased as host-vehicle speed $V_S$ approaches control-cancel vehicle speed $V_R$ as shown by a broken line of FIG. 13. Further, when host-vehicle speed $V_S$ reaches control-cancel vehicle speed $V_R$, suppression value $\Delta v_{DW}$ takes a value nearly equal to zero. Accordingly, the following control is cancelled when the deceleration takes a value nearly equal to zero. This certainly prevents the driver from having abnormal feeling.

Although the second embodiment according to the present invention has been shown and described such that limit value $\Delta v_{DW}$ is calculated on the basis of host-vehicle speed $V_S$ by executing step S35 of the processing of FIG. 12, the present invention is not limited to this and may be arranged such that limit value $\Delta v_{DW}$ is calculated on the basis of command vehicle speed V* calculated at step S15 instead of host-vehicle speed $V_S$.

Figure 14:
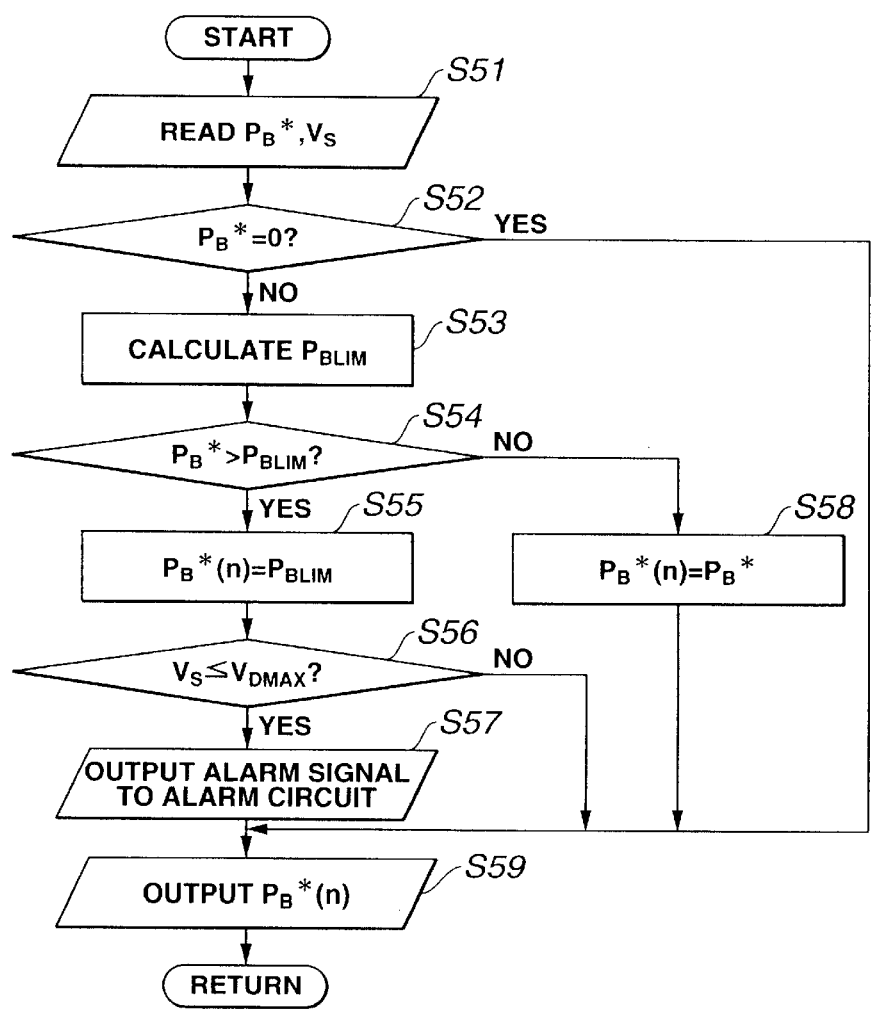
FIG. 14 is a flowchart showing a command brake hydraulic pressure calculation process employed in a third embodiment of the present invention.
Figure 15:
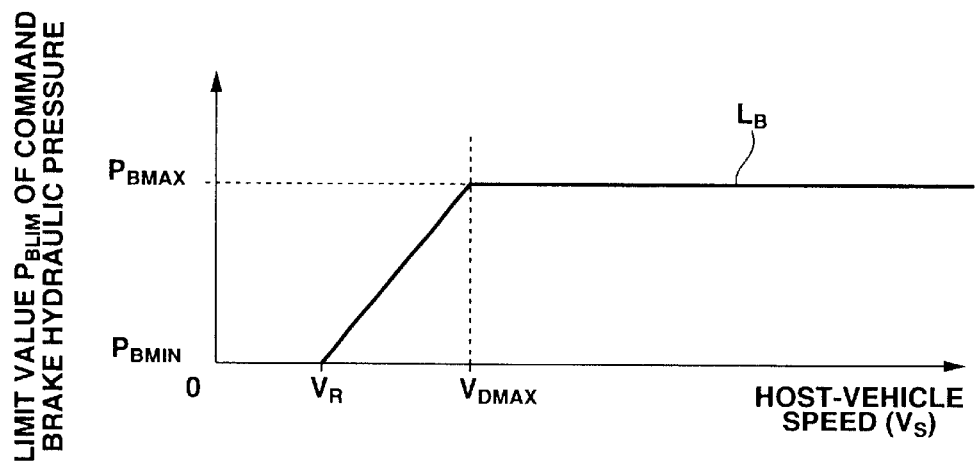
FIG. 15 is a command brake hydraulic pressure calculation map representative of a relationship between the host-vehicle speed and the command brake hydraulic pressure.

Referring to FIGS. 14 and 15, there is shown a third embodiment of ACC system according to the present invention. The basic construction of the third embodiment is basically the same as that of the first embodiment shown in FIGS. 1 and 2.

The third embodiment is specifically arranged to gradually decrease the deceleration by limiting command brake hydraulic pressure instead of a case that the deceleration is gradually decreased by limiting command vehicle speed. More specifically, the third embodiment is arranged such that drive shaft torque control section 60 executes a command brake hydraulic pressure calculation process shown in FIG. 14 as follows.

At step S51, controller 8 reads command brake hydraulic pressure $P_B^*$ calculated at braking force calculating section 65 and host-vehicle speed $V_S$ detected by vehicle speed sensor 6.

At step S52, controller 8 determines whether command brake hydraulic pressure $P_B^*$ is equal to zero or not. When the determination at step S52 is affirmative ($P_B^*=0$), controller 8 determines that the braking control is not executed.

Therefore, the routine jumps to step S59 to terminate this calculation process. When the determination at step S52 is negative ($P_B^*>0$), controller 8 determines that the braking control is being executed. Therefore, the routine proceeds to step S53 wherein controller 8 calculates a limit value $P_{BLIM}$ of command brake hydraulic pressure $P_B^*$ on the basis of host-vehicle speed $V_S$ and with reference to a limit value calculation map shown in FIG. 15.

The limit value calculation map shown in FIG. 15 has set a characteristic line which performs the following characteristics:

When host-vehicle speed $V_S$ is higher than a maximum gradual-deceleration starting vehicle speed $V_{DMAX}$, limit value $P_{BLIM}$ is maintained at a maximum limit value $P_{BMAX}$ which is a relatively large positive value corresponding to a value during an ordinary brake control.

When host-vehicle speed $V_S$ is within a range between maximum gradual-deceleration starting vehicle speed $V_{DMAX}$ and control-cancel vehicle speed $V_R$, limit value $P_{BLIM}$ is gradually decreased according to the decrease of host-vehicle speed $V_S$.

When host-vehicle speed $V_S$ is lower than or equal to control-cancel vehicle speed $V_R$, limit value $P_{BLIM}$ is maintained at a minimum limit value $P_{BMIN}$ which is equal to zero.

At step S54, controller 8 determines whether or not present command brake hydraulic pressure $P_B^*$ is higher than limit value $P_{BLIM}$ calculated at step S53. When the determination at step S54 is affirmative ($P_B>P_{BLIM}$), the routine proceeds to step S55 wherein controller 8 sets present command hydraulic pressure $P_B^*(n)$ at limit value $P_{BLIM}$ ($P_B^*(n)=P_{BLIM}$)

At step S56 subsequent to the execution of step S55, controller 8 determines whether or not host-vehicle speed $V_S$ is lower than or equal to maximum gradual-deceleration starting vehicle speed $V_{DMAX}$. When the determination at step S56 is affirmative ($V_S \leq V_{DMAX}$), the routine proceeds to step S57 wherein controller 8 outputs the alarm signal to alarm circuit 9. Then, the routine proceeds to step S59. When the determination at step S56 is negative ($V_S>V_{DMAX}$), the routine directly jumps to step S59.

On the other hand, when the determination at step S54 is negative ($P_B^* \leq P_{BLIM}$), the routine jump to step S58 wherein controller 8 sets controller 8 sets present command hydraulic pressure $P_B^*(n)$ at command brake hydraulic pressure $P_B^*$ read at step S51 ($P_B^*(n)=P_B^*$). Then, the routine proceeds to step S59.

At step S59, controller 8 outputs the present command brake hydraulic pressure $P_B^*(n)$ to brake actuator 5 through brake servo system 110. Then, the present time interruption routine is terminated.

In the processing of FIG. 14, the execution of steps S51 through S55, S58 and S59 correspond a brake hydraulic pressure gradually decreasing control means, and the execution of steps S56 and S57 and the alarm circuit 9 correspond an alarm means.

In this third embodiment, it is assumed that when host-vehicle speed VS is higher than maximum gradual-deceleration starting vehicle speed $V_{DMAX}$, inter-vehicle distance L is suddenly shortened and that braking force calculating section 65 of drive shaft torque control section 60 calculates the command brake hydraulic pressure $P_B^*$ which takes a relatively large value.

Under this condition, limit value $P_{BLIM}$ of command brake hydraulic pressure calculated at step S53 takes the maximum value $P_{BMAX}$. Since command brake hydraulic pressure $P_B^*$ is normally smaller than the maximum value $P_{BMAX}$, the routine of FIG. 14 proceeds from step S54 to step S59 through step S59. Accordingly, command brake hydraulic pressure $P_B^*$ read at step S51 is treated as present command brake hydraulic pressure $P_B^*(n)$ and is inputted to brake actuator 5 through brake servo system 110.

Accordingly, ACC system executes the deceleration control by a relatively large deceleration so that inter-vehicle distance L is brought closer to target inter-vehicle distance L*.

When host-vehicle speed $V_S$ becomes lower than or equal to maximum gradual-deceleration starting vehicle speed $V_{DMAX}$ as a result that the deceleration control is continued, limit value $P_{BLIM}$ calculated at step S53 is decreased according to the decrease of host-vehicle speed $V_S$. When limit value $P_{BLIM}$ becomes smaller than command brake hydraulic pressure $P_B^*$, the routine of FIG. 14 proceeds to step S55 wherein controller 8 sets present command brake hydraulic pressure $P_B^*(n)$ at limit value $P_{BLIM}$. This present command brake hydraulic pressure $P_B^*(n)$ is supplied to brake actuator 5 through brake servo system 110. Accordingly, the brake hydraulic pressure supplied to brake actuator 5 is decreased, and the deceleration of host-vehicle 1 is loosened according to the decrease of the generated braking force. Simultaneously, alarm circuit 9 generates alarm upon receiving the alarm signal from controller 8.

Thereafter, the brake hydraulic pressure supplied to brake actuator 5 is gradually decreased according to the decrease of limit value $P_{BLIM}$ which decreases according to the decrease of host-vehicle speed $V_S$. Therefore, the deceleration is further decreased, and at last limit value $P_{BLIM}$ reaches zero when host-vehicle speed $V_S$ reaches control-cancel vehicle speed $V_R$. Accordingly, the deceleration becomes zero since the hydraulic pressure supplied to brake actuator 5 becomes zero. Under this zero deceleration condition, the following control is cancelled. Accordingly, the third embodiment according to the present invention ensures the similar advantages ensured by the first embodiment.

Figure 16:
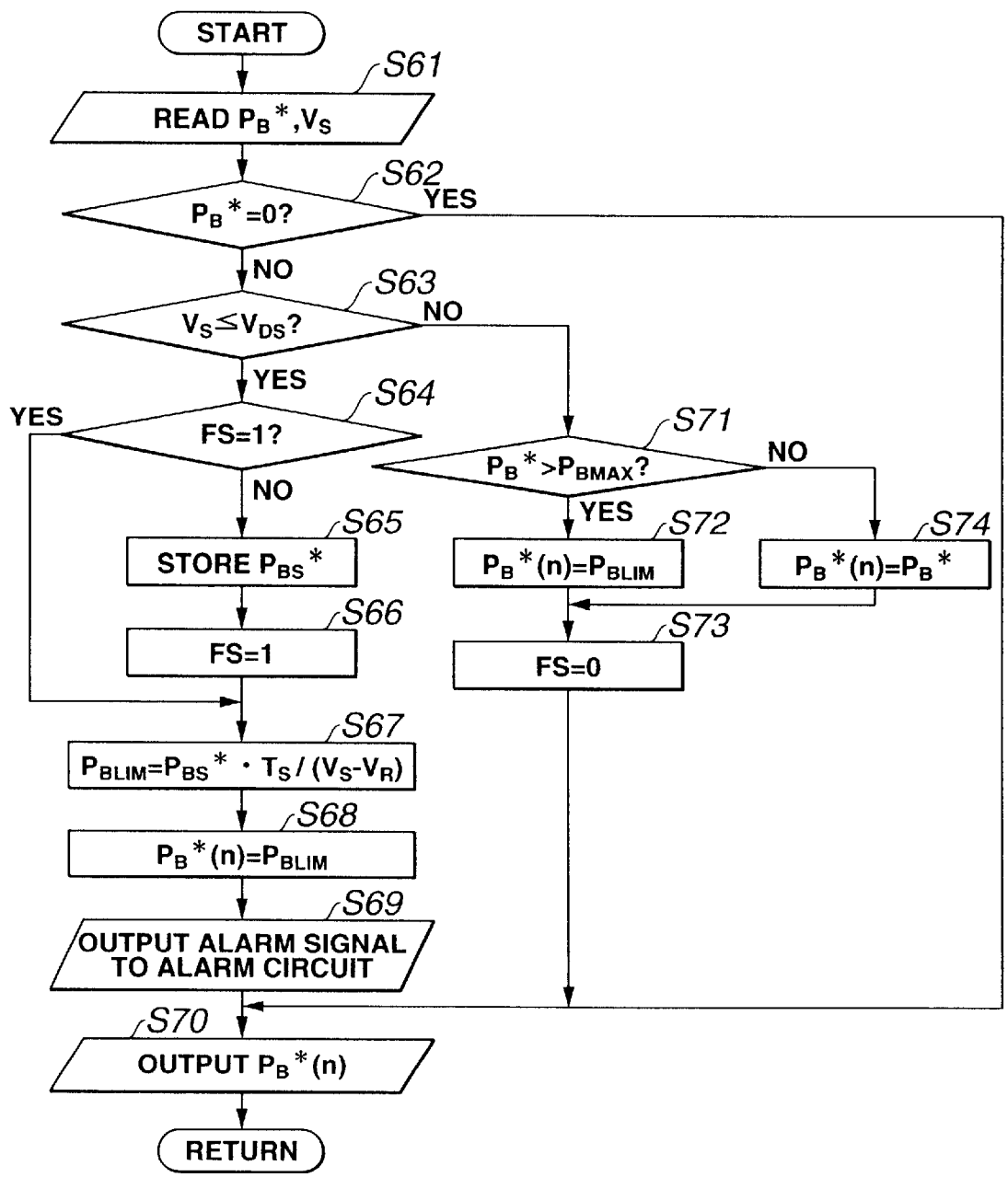
FIG. 16 is a flowchart showing a command brake hydraulic pressure calculation process employed in a fourth embodiment of the present invention.

Referring to FIG. 16, there is shown a fourth embodiment of ACC system according to the present invention. The basic construction of the fourth embodiment is basically the same as that of the first embodiment shown in FIGS. 1 and 2.

The fourth embodiment is specifically arranged such that the deceleration is loosened by limiting command brake hydraulic pressure $P_B^*$ in the same manner of the second embodiment. More specifically, drive shaft torque control section 60 of controller 8 executes the command brake hydraulic pressure calculation process shown in FIG. 16 as follows.

At step S61, controller 8 reads command brake hydraulic pressure $P_B^*$ and host-vehicle speed $V_S$.

At step S62, controller 8 determines whether command brake hydraulic pressure $P_B^*$ is equal to zero or not. When the determination at step S62 is affirmative ($P_B^*=0$), the routine jumps to step S70. When the determination at step S62 is negative ($P_B>0$), the routine proceeds to step S63.

At step S63, controller 8 determines whether or not present host-vehicle speed $V_S$ is lower than or equal to gradual-deceleration starting vehicle speed $V_{DS}$. When the determination at step S63 is affirmative ($V_S \leq V_{DS}$), the routine proceeds to step S64. When the determination at step S63 is negative ($V_S>V_{DS}$), the routine proceeds to step S71.

At step S64, controller 8 determines whether initial-condition flag FS is set at 1 or not. When the determination at step S64 is affirmative (FS=1), the routine jumps to step S67. When the determination at step S63 is negative (FS=0), the routine proceeds to step S65.

At step S65, controller 8 stores present command brake hydraulic pressure $P_B^*$ as an initial value $P_{BS}$.

At step 66, controller 8 sets initial-condition flag FS at 1 (FS=1), and the routine proceeds to step S67.

At step S67, controller 8 calculates limit value $P_{BLIM}$ of command brake hydraulic pressure $P_B^*$ by executing the calculation of the following expression (16):

$$P_{BLIM} = P_{BS}^* \times T_S/(V_S - V_R). \tag{16}$$

At step S68, controller 8 sets present command brake hydraulic pressure $P_B^*(n)$ at limit value $P_{BLIM}$ calculated at step S67 ($P_B^*(n)=P_{BLIM}$).

At step S69, controller 8 outputs an alarm signal to alarm circuit 9. Then the routine proceeds to step S70 wherein controller 8 outputs present command brake hydraulic pressure $P_B^*(n)$ to brake servo system 110.

On the other hand, at step S71 subsequent to the negative determination at step S63, controller 8 determines whether or not command brake hydraulic pressure $P_B^*$ is greater than a maximum limit value $P_{BMAX}$ of command brake hydraulic pressure $P_B^*$. When the determination at step S71 is affirmative ($P_B^*(n)>P_{BMAX}$), the routine proceeds to step S72 wherein controller 8 sets present command brake hydraulic pressure $P_B^*(n)$ at maximum limit value $P_{BMAX}$. When the determination at step S71 is negative ($P_B^*(n)<P_{BMAX}$), the routine proceeds to step S74 wherein controller 8 sets present command brake hydraulic pressure $P_B^*(n)$ at command brake hydraulic pressure $P_B^*$ read at step S61.

At step S73 subsequent to the execution of step S72 or S74, controller 8 sets initial-condition flag FS at 0 (FS=0). Thereafter, the routine proceeds to step S70.

In the processing of FIG. 16, the execution of steps S61 through S68 and step S70 correspond to a brake-hydraulic-pressure gradual control means. The execution of step S69 and alarm circuit 9 correspond an alarm means.

The fourth embodiment according to the present invention is arranged, as is similar to the second embodiment, such that when host-vehicle speed $V_S$ becomes lower than or equal to gradual-deceleration starting vehicle speed $V_{DS}$ ($V_S \leq V_{DS}$), command brake hydraulic pressure $P_B^*$ is set at initial value $P_{BS}^*$. Accordingly, command brake hydraulic pressure $P_B^*(n)$ is decreased as host-vehicle speed $V_S$ approaches control-cancel vehicle speed $V_R$, and command brake hydraulic pressure $P_B^*$ takes zero when host-vehicle speed $V_S$ reaches control-cancel vehicle speed $V_R$. This enables command brake hydraulic pressure $P_B^*(n)$ to be set at zero when host-vehicle speed $V_S$ reaches control-cancel vehicle speed $V_R$ regardless the magnitude of command brake hydraulic pressure $P_B^*$. Consequently, the fourth embodiment according to the present invention also ensures the advantages ensured by the second embodiment.

Although the preferred embodiments according to the present invention have been shown and described to be adapted to a vehicle equipped with internal combustion engine 2 as a power source, it will be understood that the invention is not limited to this and may be adapted to a vehicle equipped with an electric motor as power source. Further, the present invention may be adapted to a hybrid vehicle which employs an internal combustion engine and an electric motor. In such a case, a regenerative braking force of the electric motor may be utilized as a braking force.

This application is based on Japanese Patent Applications No. 2001-231744 filed on Jul. 31, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An adaptive cruise control (ACC) system for a host-vehicle, comprising:
   a controller programmed,
   to detect an inter-vehicle distance between the host-vehicle and a preceding vehicle ahead of the host-vehicle,
   to detect a host-vehicle speed of the host-vehicle,
   to calculate a command vehicle speed on the basis of the inter-vehicle distance and the host-vehicle speed to bring the inter-vehicle distance closer to a target inter-vehicle distance,
   to control one of a driving force and a braking force according to the command vehicle speed,
   to cancel controlling one of the driving force and the braking force according to the command vehicle speed when the host-vehicle speed is lower than or equal to a control-cancel vehicle speed, and
   to gradually decrease a deceleration of the host-vehicle according to an approach of the host-vehicle speed toward the control-cancel vehicle speed when the host-vehicle speed becomes lower than or equal to a gradual-deceleration starting vehicle speed during a period of decreasing the host-vehicle speed toward the control-cancel vehicle speed, so that the deceleration takes a value near zero when the host-vehicle speed reaches the control-cancel vehicle speed.

2. The ACC system as claimed in claim 1, wherein the controller is further programmed to start gradually decreasing the deceleration, when the host-vehicle is being decelerated by a predetermined decreasing rate of change of the deceleration relative to the host-vehicle speed.

3. The ACC system as claimed in claim 1, wherein the controller stores a control map representative that a limit value for limiting a rate of change of the command vehicle speed according to the target inter-vehicle distance takes a maximum value when the host-vehicle speed is higher than or equal to an upper limit of the gradual-deceleration starting vehicle speed, that the limit value is gradually deceased according to decrease of the host-vehicle speed when the host-vehicle speed is lower than the upper limit, and that the limit value takes a value near zero when the host-vehicle speed is equal to the control-cancel vehicle speed, the controller being programmed to calculate the limit value from the control map and the host-vehicle speed, and to limit the command vehicle speed by the obtained limit value.

4. The ACC system as claimed in claim 1, wherein the controller is further programmed to detect the deceleration of the host-vehicle and to sequentially calculate a command deceleration for bringing the deceleration closer to zero at the control-cancel vehicle speed on the basis of the host-vehicle speed and the detected deceleration when the controller starts gradually decreasing the deceleration.

5. The ACC system as claimed in claim 1, wherein the controller is further programmed to inform a driver of the host-vehicle that the controller starts gradually decreasing the deceleration.

6. The ACC system as claimed in claim 1, further comprising an inter-vehicle distance sensor that detects the inter-vehicle distance and outputs an inter-vehicle distance indicative signal to the controller, and a vehicle speed sensor that detects the host-vehicle speed and outputs a host-vehicle speed indicative signal to the controller.

7. The ACC system as claimed in claim 1, further comprising an internal combustion engine that generates the driving force and a braking system that generates the braking force.

8. An adaptive cruise control (ACC) system for a host-vehicle, comprising:
   a controller programmed,
      to detect an inter-vehicle distance between the host-vehicle and a preceding vehicle ahead of the host-vehicle,
      to detect a host-vehicle speed of the host-vehicle,
      to calculate a command vehicle speed on the basis of the inter-vehicle distance and the host-vehicle speed to bring the inter-vehicle distance closer to a target inter-vehicle distance,
      to control one of a driving force and a brake hydraulic pressure according to the command vehicle speed,
      to cancel controlling one of the driving force and the brake hydraulic pressure according to the command vehicle speed when the host-vehicle speed is lower than or equal to a control-cancel vehicle speed, and
      to gradually decrease the brake hydraulic pressure according to an approach of the host-vehicle speed toward the control-cancel vehicle speed when the host-vehicle speed becomes lower than or equal to a gradual-deceleration starting vehicle speed during a period of decreasing the host-vehicle speed toward the control-cancel vehicle speed, so that the brake hydraulic pressure takes a value near zero when the host-vehicle speed reaches the control-cancel vehicle speed.

9. The ACC system as claimed in claim 8, wherein the controller is further programmed to start gradually decreasing the brake hydraulic pressure, when the host-vehicle is being decelerated by a predetermined decreasing rate of change of the brake hydraulic pressure relative to the host-vehicle speed.

10. The ACC system as claimed in claim 8, wherein the controller stores a control map representative that a pressure limit value for limiting the brake hydraulic pressure takes a maximum value when the host-vehicle speed is higher than or equal to an upper limit of the gradual-deceleration starting vehicle speed, that the pressure limit value is gradually deceased according to decrease of the host-vehicle speed when the host-vehicle speed is lower than the upper limit, and that the pressure limit value takes a value near zero when the host-vehicle speed is equal to the control-cancel vehicle speed, the controller being programmed to calculate the pressure limit value from the control map and the host-vehicle speed, and to limit the brake hydraulic pressure by the obtained pressure limit value.

11. The ACC system as claimed in claim 8, wherein the controller is further programmed to detect the brake hydraulic pressure and to sequentially calculate a command brake hydraulic pressure for bringing a deceleration of the host-vehicle closer to zero at the control-cancel vehicle speed on the basis of the host-vehicle speed and the detected brake hydraulic pressure when the controller starts gradually decreasing the brake hydraulic pressure.

12. The ACC system as claimed in claim 8, wherein the controller is further programmed to inform a driver of the host-vehicle that the controller starts gradually decreasing the brake hydraulic pressure.

13. The ACC system as claimed in claim 1, wherein the controller is programmed to increase a target time gap for calculating a target inter-vehicle distance to a low-speed target time gap when the host-vehicle speed becomes lower than or equal to a predetermined vehicle speed higher than the control starting vehicle speed.

14. The ACC system as claimed in claim 13, wherein the controller is programmed to gradually increase the target time gap when the target time gap is increased.

15. An adaptive cruise control (ACC) system for a host-vehicle, comprising:
   inter-vehicle distance detecting means for detecting an inter-vehicle distance between the host-vehicle and a preceding vehicle ahead of the host-vehicle;
   host-vehicle speed detecting means for detecting a vehicle speed of the host-vehicle;
   inter-vehicle distance controlling means for calculating a command vehicle speed on the basis of the inter-vehicle distance and the host-vehicle speed to bring the inter-vehicle distance closer to a target inter-vehicle distance;
   driving/braking force controlling means for controlling one of a driving force and a braking force according to the command vehicle speed; and
   control canceling means for putting the inter-vehicle distance controlling means into an inoperative state when the host-vehicle speed is smaller than or equal to a control-cancel vehicle speed;
   wherein the driving/braking controlling means comprises gradual-deceleration controlling means for gradually decreasing a deceleration of the host-vehicle according to an approach of the host-vehicle speed to the control-cancel vehicle speed when the host-vehicle speed becomes lower than or equal to a gradual-deceleration starting speed during a period of decreasing the host-vehicle speed toward the control-cancel vehicle speed, so that the deceleration takes a value near zero when the host-vehicle speed reaches the control-cancel vehicle speed.

16. A method of executing an adaptive cruise control of a host-vehicle, comprising:
   detecting an inter-vehicle distance between the host-vehicle and a preceding vehicle ahead of the host-vehicle;
   detecting a vehicle speed of the host-vehicle;
   calculating a command vehicle speed on the basis of the inter-vehicle distance and the host-vehicle speed to bring the inter-vehicle distance closer to a target inter-vehicle distance;
   controlling one of a driving force and a braking force according to the command vehicle speed;
   canceling to control one of a driving force and a braking force according to the command vehicle speed when the host-vehicle speed is smaller than or equal to a control-cancel vehicle speed; and gradually decreasing a deceleration of the host-vehicle according to an approach of the host-vehicle speed to the control-cancel vehicle speed when the host-vehicle speed becomes lower than or equal to a gradual-deceleration starting vehicle speed during a period of decreasing the host-vehicle speed toward the control-cancel vehicle speed, so that the deceleration takes a value near zero when the host-vehicle speed reaches the control-cancel vehicle speed.

* * * * *